US011136192B2

(12) United States Patent
Ahmann et al.

(10) Patent No.: US 11,136,192 B2
(45) Date of Patent: Oct. 5, 2021

(54) AUTOMATED WAREHOUSE FULFILLMENT OPERATIONS AND SYSTEM

(71) Applicants: Doerfer Corporation, Waverly, IA (US); Robert D. Ahmann, Rochester, MN (US)

(72) Inventors: Robert D. Ahmann, Rochester, MN (US); David L. Takes, Cedar Falls, IA (US); Gregory H. Gasch, Waverly, IA (US); William D. Starnes, Simpsonville, SC (US); Neil D. Bultz, Greenville, SC (US)

(73) Assignees: Doerfer Corporation, Waverly, IA (US); Robert D. Ahmann, Rochester, MN (US)

( * ) Notice: Subject to any disclaimer, the term of this patent is extended or adjusted under 35 U.S.C. 154(b) by 149 days.

(21) Appl. No.: 16/339,471

(22) PCT Filed: Oct. 6, 2017

(86) PCT No.: PCT/US2017/055664
§ 371 (c)(1),
(2) Date: Apr. 4, 2019

(87) PCT Pub. No.: WO2018/068024
PCT Pub. Date: Apr. 12, 2018

(65) Prior Publication Data
US 2020/0198892 A1 Jun. 25, 2020

Related U.S. Application Data

(60) Provisional application No. 62/405,219, filed on Oct. 6, 2016.

(51) Int. Cl.
*G06F 7/00* (2006.01)
*B65G 1/137* (2006.01)
(Continued)

(52) U.S. Cl.
CPC .......... *B65G 1/1375* (2013.01); *B25J 5/007* (2013.01); *B25J 5/02* (2013.01); *B65G 1/0485* (2013.01);
(Continued)

(58) Field of Classification Search
CPC .. B65G 1/1375; B65G 1/1373; B65G 1/0485; B65G 1/0492; B65G 1/1376;
(Continued)

(56) References Cited

U.S. PATENT DOCUMENTS 3,033,392 A 5/1962 Bauman et al.
3,880,299 A 4/1975 Zollinger
(Continued)

FOREIGN PATENT DOCUMENTS

CH 513056 9/1971
DE 2034834 A1 1/1972
(Continued)

OTHER PUBLICATIONS

Canadian Patent Examiner, "Second Office Action for related Canadian Patent Application No. 3,039,049, dated Dec. 15, 2020, 4 pages."
(Continued)

*Primary Examiner* — Yolanda R Cumbess
(74) *Attorney, Agent, or Firm* — Charles A. Lemaire; Jonathan M. Rixen; Lemaire Patent Law Firm, P.L.L.C.

(57) ABSTRACT

A method and apparatus of moving a picker on an automatically guided vehicle (AGV) along with a plurality of totes to a successive plurality of inventory stock bins to allow the picker to successively retrieve each of a plurality of stock items from the stock bins and place the respective items in a preselected one of the plurality of totes based on a
(Continued)

customer order. In some embodiments, the picker is a human picker. In some embodiments, the totes are shipping containers.

29 Claims, 8 Drawing Sheets

(51) Int. Cl.
*B65G 1/04* (2006.01)
*G05B 19/418* (2006.01)
*G05D 1/02* (2020.01)
*G06Q 10/08* (2012.01)
*G05D 1/00* (2006.01)
*B25J 5/00* (2006.01)
*B25J 5/02* (2006.01)

(52) U.S. Cl.
CPC ......... *B65G 1/0492* (2013.01); *B65G 1/1373* (2013.01); *B65G 1/1376* (2013.01); *B65G 1/1378* (2013.01); *G05B 19/41895* (2013.01); *G05D 1/0016* (2013.01); *G05D 1/0212* (2013.01); *G05D 1/0225* (2013.01); *G06Q 10/087* (2013.01); *G05D 2201/0216* (2013.01)

(58) Field of Classification Search
CPC ........ B65G 1/1378; B65G 1/0407; B25J 5/02; B25J 5/007; G05D 1/0016; G05D 1/0212; G05D 2201/0216; G05B 19/41895; G05B 1/0225; G06Q 10/087; G06Q 10/08; B66F 11/04; B66F 9/07; B66F 11/042; B66F 9/063
USPC ................. 700/213–218, 226, 228, 230, 231
See application file for complete search history.

(56) References Cited

U.S. PATENT DOCUMENTS

| | | | |
|---|---|---|---|
| 4,007,843 A | 2/1977 | Lubbers | |
| 4,043,463 A | 8/1977 | Hansen | |
| 4,618,031 A | 10/1986 | Belloche | |
| 4,690,606 A | 9/1987 | Ross | |
| 5,364,220 A | 11/1994 | Killinger | |
| 7,402,018 B2 | 7/2008 | Mountz et al. | |
| 7,686,171 B1 | 3/2010 | Shakes et al. | |
| 7,826,919 B2 | 11/2010 | D'Andrea et al. | |
| 7,850,413 B2 | 12/2010 | Fontana | |
| 7,873,469 B2 | 1/2011 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,220,710 B2 | 7/2012 | Hoffman et al. | |
| 8,239,291 B2 | 8/2012 | Hoffman et al. | |
| 8,276,739 B2 | 10/2012 | Bastian et al. | |
| 8,311,902 B2 | 11/2012 | Mountz et al. | |
| 8,403,614 B2 | 3/2013 | Bastian, II et al. | |
| 8,483,869 B2 | 7/2013 | Wurman et al. | |
| 8,538,692 B2 | 9/2013 | Wurman et al. | |
| 8,649,899 B2 | 2/2014 | Wurman et al. | |
| 8,798,786 B2 | 8/2014 | Wurman et al. | |
| 8,805,573 B2 | 8/2014 | Brunner et al. | |
| 8,831,984 B2 | 9/2014 | Hoffman et al. | |
| 8,965,562 B1 | 2/2015 | Wurman et al. | |
| 8,972,045 B1 | 3/2015 | Mountz et al. | |
| 9,009,072 B2 | 4/2015 | Mountz et al. | |
| 9,120,622 B1 | 9/2015 | Elazary et al. | |
| 9,139,363 B2 | 9/2015 | Lert | |
| 9,330,373 B2 | 5/2016 | Mountz et al. | |
| 9,378,482 B1* | 6/2016 | Pikler | G06Q 10/087 |
| 9,409,711 B1* | 8/2016 | Hanssen | B65G 1/1376 |
| 9,519,882 B2* | 12/2016 | Galluzzo | B65G 1/1373 |
| 9,550,624 B2 | 1/2017 | Khodl et al. | |
| 9,555,978 B1* | 1/2017 | Hanssen | B65G 1/1378 |
| 9,592,961 B2 | 3/2017 | Weiss | |
| 9,604,782 B2 | 3/2017 | Winkler | |
| 9,785,911 B2 | 10/2017 | Galluzzo et al. | |
| 9,914,627 B2 | 3/2018 | Shugen | |
| 10,214,354 B2* | 2/2019 | Toebes | G06Q 10/087 |
| 10,562,705 B2 | 2/2020 | Pankratov et al. | |
| 2002/0021954 A1 | 2/2002 | Winkler | |
| 2005/0043850 A1 | 2/2005 | Stevens et al. | |
| 2006/0045727 A1 | 3/2006 | Jungbluth | |
| 2010/0218131 A1 | 8/2010 | Holm-Petersen et al. | |
| 2011/0058926 A1 | 3/2011 | Winkler | |
| 2012/0321423 A1* | 12/2012 | MacKnight | H01L 21/67724 414/664 |
| 2015/0060199 A1 | 3/2015 | Overfield | |
| 2016/0042315 A1 | 2/2016 | Field-Darragh et al. | |
| 2016/0145044 A1* | 5/2016 | Mountz | B65G 1/1373 700/216 |
| 2017/0129133 A1 | 5/2017 | Bolivar | |
| 2018/0150793 A1* | 5/2018 | Lert, Jr. | G06Q 10/0833 |
| 2020/0031578 A1* | 1/2020 | Lisso | B65G 1/0492 |
| 2020/0242544 A1* | 7/2020 | Galluzzo | B25J 11/00 |
| 2021/0039886 A1* | 2/2021 | Lisso | B65G 1/1375 |

FOREIGN PATENT DOCUMENTS

| | | |
|---|---|---|
| DE | 9404044 | 6/1994 |
| JP | 2001_261126 A | 9/2001 |
| WO | WO_2008091733 A2 | 7/2008 |
| WO | WO_2012156355 A1 | 11/2012 |
| WO | WO_2014011459 | 1/2014 |

OTHER PUBLICATIONS

Singaporean Patent Examiner, "Search Report / Written Opinion for related Singaporean Patent Application No. 11201902877X, dated Sep. 22, 2020, 11 pages."
"PCT International Preliminary Report on Patentability (Chapter II) for parent PCT/US2017/055664 application, (Corrected) dated Apr. 16, 2019, 25 pages."
"PCT International Preliminary Report on Patentability (Chapter II) for related PCT/US2017/055667 application, dated Jan. 28, 2019, 87 pages."
Canadian Patent Examiner, "Office Action for related Canadian Patent Application No. 3,039,049, dated May 7, 2020, 6 pages."
EPO Patent Examiner, "Supplementary Search Report and Opinion for related Application EP 17859301.8 (published as EP3523227), dated May 27, 2020, 13 pages."

* cited by examiner

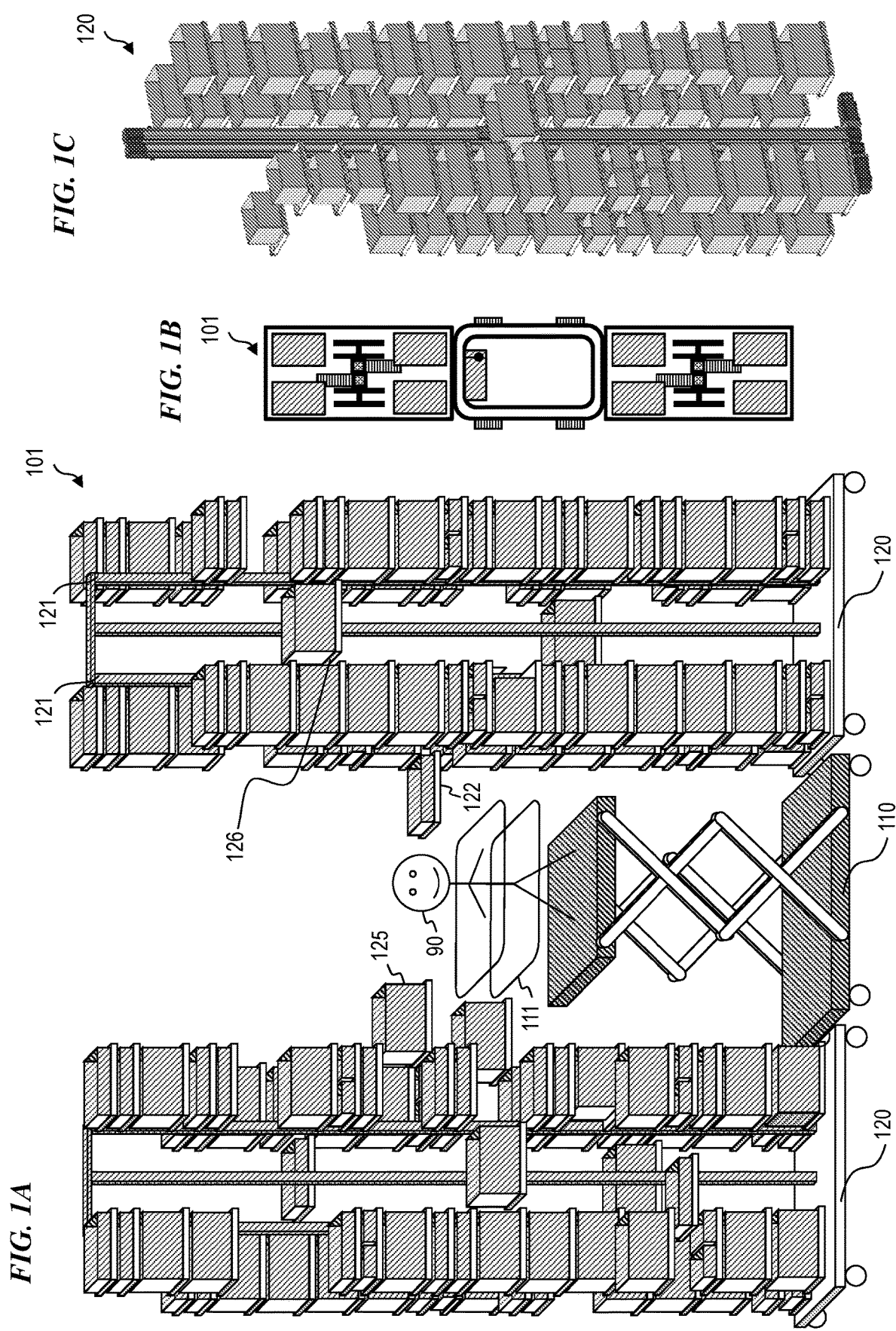

AUTOMATED WAREHOUSE FULFILLMENT OPERATIONS AND SYSTEM

CROSS-REFERENCE TO RELATED APPLICATIONS

This United States application is a national-phase filing of, and claims priority benefit of, PCT Patent Application No. PCT/US2017/055664, filed Oct. 6, 2017 by Robert D. Ahmann, et al. and titled "Automated warehouse fulfillment operations and system," which claims priority benefit, including under 35 U.S.C. § 119(e), of U.S. Provisional Patent Application No. 62/405,219, filed Oct. 6, 2016 by Robert D. Ahmann, titled "Automated warehouse fulfillment operations and system," each of which is incorporated herein by reference in its entirety.

FIELD OF THE INVENTION

This invention relates to the field of inventory movement, and more specifically to a method and apparatus of moving a human picker on an automatically guided vehicle (AGV) along with a plurality of shipping containers to a successive plurality of inventory stock bins to allow the human picker to successively retrieve each of a plurality of stock items from the stock bins and place the respective items in a preselected one of the plurality of shipping containers based on a customer order.

BACKGROUND OF THE INVENTION

Fulfillment of internet orders for goods by customers has become a very important and cost-competitive business. For a company to be profitable, it is important to fill the order correctly, quickly and inexpensively. The prior art describes the various problems and prior attempts to solve the problem of filling the respective shipping container for each order with the correct items. Several prior art schemes place a human (this person is often called a "picker") at a fixed location and have robots move containers of source inventory to the picker's location in order that the picker may select an item from its container and place the item in the shipping container destined for a particular customer. There are numerous problems with this goods-to-picker conventional method. Several patents describe aspects of this scheme.

U.S. Pat. No. 7,402,018 to Mountz et al. issued on Jul. 22, 2008 with the title "Inventory system with mobile drive unit and inventory holder", and is incorporated herein by reference. This patent describes a system for transporting inventory that includes an inventory holder and a mobile drive unit. The inventory holder includes a frame capable of storing inventory items and a docking plate capable of receiving a docking head from underneath. The mobile drive unit includes a docking head capable of coupling to the docking plate and a drive module capable of propelling the mobile drive unit. The mobile drive unit is further capable to move the inventory holder when the docking head is coupled to the inventory holder.

U.S. Pat. No. 7,826,919 to D'Andrea, et al. issued on Nov. 2, 2010 with the title "Method and system for transporting inventory items", and is incorporated herein by reference. This patent describes includes an inventory holder, capable of storing inventory items, and a mobile drive unit. The mobile drive unit is capable of moving to a first point with the inventory holder coupled to and/or supported by the mobile drive unit. The mobile drive unit is additionally capable of determining a location of the inventory holder and calculating a difference between the location of the inventory holder and the first point. The mobile drive unit is then capable of determining whether the difference is greater than a predetermined tolerance. In response to determining that the difference is greater than the predetermined tolerance, the mobile drive unit is also capable of moving to a second point based on the location of the inventory holder, docking with the inventory holder, and moving the mobile drive unit and the inventory holder to the first point.

U.S. Pat. No. 7,850,413 to Fontana issued on Dec. 14, 2010 with the title "System and method for transporting inventory items", and is incorporated herein by reference. This patent describes an apparatus for transporting inventory items that includes a housing, a drive module, a docking module, an elevating shaft, and a rotation module. The drive module is capable of propelling the apparatus in at least a first direction. The docking head is capable of coupling to or supporting an inventory holder. The rotation module is capable of inducing rotation in the housing relative to the elevating shaft. The elevating shaft connects to the docking head and is capable of raising the docking head when the housing is rotated relative to the elevating shaft.

U.S. Pat. No. 7,873,469 to D'Andrea, et al. issued on Jan. 18, 2011 with the title "System and method for managing mobile drive units", and is incorporated herein by reference. This patent describes a method for moving a mobile drive unit within a workspace includes receiving a path. The path includes at least an initial segment and one or more additional segments. The initial segment includes a portion of the path adjacent to the first point; and at least one of the additional segments includes a portion of the path adjacent to the second point. The method further includes storing the path, reserving the initial segment of the path, and moving away from the first point along the initial segment. After initiating movement along the initial segment, the method includes reserving each of the additional segments of the path and moving toward the second point along each of the additional segments while that segment is reserved.

U.S. Pat. Nos. 7,894,932 and 7,894,933 to Mountz, et al. issued on Feb. 22, 2011 with the titles "Method and system for replenishing inventory items" and "Method and system for retrieving inventory items", and are incorporated herein by reference. These patents describe a method for storing inventory items in an inventory system that includes receiving a replenish request identifying an inventory item to be stored in an inventory system and determining a classification of the inventory item to be stored. The method also includes selecting an inventory holder from a plurality of inventory holders based, at least in part, on the classification of the inventory item to be stored and a classification of one or more other inventory items currently stored in the selected inventory holder. Additionally, the method includes transmitting information identifying the selected inventory holder to a mobile drive unit. The patents also describe receiving a retrieval request that identifies an inventory item and selecting, from a plurality of inventory stations, an inventory station to fulfill an order associated with the retrieval request. The method also includes selecting an inventory holder from a plurality of inventory holders that store the inventory item and selecting, from a plurality of mobile drive units, a mobile drive unit to move the selected inventory holder to the selected inventory station.

U.S. Pat. No. 7,912,574 to Wurman, et al. issued on Mar. 22, 2011 with the title "System and method for transporting inventory items", and is incorporated herein by reference. This patent describes a method for transporting inventory items that includes moving a mobile drive unit to a first point within a workspace. The first point is a location of an inventory holder. The method further includes docking the mobile drive unit with the inventory holder and moving the mobile drive unit and the inventory holder to a second point within the workspace. The second point is associated with conveyance equipment. The method further includes moving the inventory holder to a third point within the workspace using the conveyance equipment.

U.S. Pat. No. 7,920,962 to D'Andrea, et al. issued on Apr. 5, 2011 with the title "System and method for coordinating movement of mobile drive units", and is incorporated herein by reference. This patent describes a method, for moving one or more mobile drive units within a workspace, that includes receiving, from a first mobile drive unit, a reservation request requesting use of a first path segment to move in a first direction. The method further includes determining that a second mobile drive unit is currently located on the first path segment and determining whether the second mobile drive unit is moving in the first direction. Additionally, the method includes transmitting a reservation response indicating that the reservation request is denied, in response to determining that the second mobile drive unit is not moving in the first direction. The method also includes transmitting a reservation response indicating that the reservation request is granted, in response to determining that the second mobile drive unit is moving in the first direction.

U.S. Pat. No. 8,220,710 to Hoffman, et al. issued on Jul. 17, 2012 with the title "System and method for positioning a mobile drive unit", and is incorporated herein by reference. This patent describes a method (for transporting inventory items) that includes determining an assignment state of a mobile drive unit. The method also includes selecting a location for the mobile drive unit based on the assignment state of the mobile drive unit, in response to determining that the mobile drive unit is not currently completing a task. The method further includes transmitting information to the mobile drive unit identifying the selected location.

U.S. Pat. No. 8,239,291 to Hoffman, et al. issued on Aug. 7, 2012 with the title "System and method for communicating status information of inventory-related tasks using a status indicator", and is incorporated herein by reference. This patent describes a method for communicating information pertaining to a task includes receiving wirelessly first status information. The first status information specifies a first status associated with a task. The method also includes indicating the first status to a user and receiving input from the user indicating a second status associated with the task. Additionally, the method includes transmitting wirelessly second status information to a remote device in response to receiving the input from the user. The second status information specifies the second status.

U.S. Pat. No. 8,311,902 to Mountz, et al. issued on Nov. 13, 2012 with the title "System and method for filling an order", and is incorporated herein by reference. This patent describes a method for fulfilling inventory requests that includes receiving an inventory request requesting an inventory item and selecting the requested inventory item from an inventory holder. The method further includes storing the requested inventory item in an order holder associated with the inventory request and moving the order holder to a storage space. In addition, the method includes detecting a triggering event and in response to detecting the triggering event, retrieving the order holder from the storage space.

U.S. Pat. No. 8,483,869 to Wurman, et al. issued on Jul. 9, 2013 with the title "Method and system for fulfilling requests in an inventory system", and is incorporated herein by reference. This patent describes a method (for fulfilling requests in an inventory system) that includes receiving a request indicating an activity to be completed. The method also includes selecting a holder to fulfill the request and an inventory station at which to fulfill the request. The inventory station is associated with a queue that includes a plurality of queue spaces. The method further includes moving the selected holder from a first location to a second location remote from the selected inventory station. Additionally, the method also includes determining that a trigger event has occurred and, in response to determining that the trigger event has occurred, moving the selected holder from the second location to a queue space of a queue associated with the selected inventory station.

U.S. Pat. No. 8,538,692 to Wurman, et al. issued on Sep. 17, 2013 with the title "System and method for generating a path for a mobile drive unit", and is incorporated herein by reference. This patent describes a method of transporting inventory items that includes receiving a route request from a mobile drive unit. The route request identifies a destination location within a workspace. The workspace includes at least one cell associated with a first cell attribute and at least one cell that is not associated with the first cell attribute. The method includes determining a state of the mobile drive unit. The method also includes generating a path to the destination location for the mobile drive unit that traverses cells associated with the first cell attribute, in response to determining that the mobile drive unit is associated with a first state. The method includes generating a path to the destination location for the mobile drive unit that does not traverse cells associated with the first cell attribute, in response to determining the mobile drive unit is not associated with the first state. The method further includes transmitting the path to the mobile drive unit.

U.S. Pat. No. 8,649,899 to Wurman, et al. issued on Feb. 11, 2014 with the title "System and method for maneuvering a mobile drive unit", and is incorporated herein by reference. This patent describes a method of rotating an inventory holder includes moving an inventory holder towards a rotation area along a straight segment of a path with a first face of the inventory holder facing a first direction. The rotation area includes a portion of a workspace designated for rotation of inventory holders. The method further includes moving the inventory holder into the rotation area along a first arced segment with an orientation of the first face perpendicular to the first arced segment. The method additionally includes executing a rotation maneuver within the rotation area and moving the inventory holder out of the rotation area along a second arced segment with a second face facing the first direction.

U.S. Pat. No. 8,798,786 to Wurman, et al. issued on Aug. 5, 2014 with the title "System and method for processing waste material", and is incorporated herein by reference. This patent describes a method for processing waste in a material-handling system that includes detecting an occurrence of a trigger event associated with a waste holder located at a first location and, in response to detecting the trigger event, moving a mobile drive unit to the first location. The method also includes loading waste material onto the mobile drive unit at the first location and transporting the waste material to a waste station using the mobile drive unit.

U.S. Pat. No. 8,805,573 to Brunner, et al. issued on Aug. 12, 2014 with the title "System and method for order fulfillment", and is incorporated herein by reference. This patent describes a system includes a first mobile drive unit and a second mobile drive unit. The system also includes a first inventory holder, a second inventory holder, and a third inventory holder. An inventory station includes a first location and a second location and the inventory station operable to receive a first inventory item from the first inventory holder at the first location. The first inventory holder transported by the first mobile drive unit. The inventory station also operable to receive a second inventory item from the second inventory holder at the first location. The second inventory holder transported by the second mobile drive unit. The inventory station also operable to receive a third inventory item from the third inventory holder at the second location. The third inventory holder is fixed at the second location while the inventory station receives the first and second inventory item.

U.S. Pat. No. 8,831,984 to Hoffman, et al. issued on Sep. 9, 2014 with the title "System and method for inventory management using mobile drive units", and is incorporated herein by reference. This patent describes a method for inventory management that includes deploying a first mobile drive unit having first dimensions and deploying a second mobile drive unit having second dimensions, the first and second dimensions being different. The first and second mobile drive units are operable to transport inventory items to a plurality of inventory stations in the same workspace.

U.S. Pat. No. 8,965,562 to Wurman, et al. issued on Feb. 24, 2015 with the title "Efficient shuffling of mobile drive units for inventory holders", and is incorporated herein by reference. This patent describes an inventory system that has mobile drive units that freely and independently move about a facility to transport inventory holders. The mobile drive units may operate through communications with other drive units, or under a more centralized control of a management module. For various operating scenarios, the mobile drive units are directed to shuffle the inventory holders in a manner that minimizes travel of the mobile drive units, thereby improving overall system efficiency. One or more single mobile drive units may be used to transport inventory holders to and from a region, and to sequentially reposition or slide each of the inventory holders within the region according to a priority ordering.

U.S. Pat. No. 8,972,045 to Mountz, et al. issued on Mar. 3, 2015 with the title "Inter-facility transport in inventory management and fulfillment systems", and is incorporated herein by reference. This patent describes, in an infrastructure that uses a mobile order fulfillment system, robotic drive units that may be dispatched and instructed to bring inventory holders to a workstation where at least one of the inventory holders is packed and prepared for shipment. The robotic drive units are then instructed to move the prepared inventory holder to a transport vehicle such as a truck. Fiducial marks may be removably placed within the transport vehicle to aid navigation of the robotic drive units. At a destination facility, additional robotic drive units may be instructed to move the inventory holders from the truck and place the inventory holders at appropriate storage locations.

U.S. Pat. No. 9,009,072 to Mountz, et al. issued on Apr. 14, 2015 with the title "Filling an order at an inventory pier", and is incorporated herein by reference. This patent describes a system that includes an inventory pier, a mobile drive unit, and a management module. The inventory pier includes a defined area arranged to station an inventory holder. The inventory holder stores an inventory item. The mobile drive unit is operable to transport an order holder. The management module is operable to calculate a metric associated with demand for the inventory item. Based at least in part upon the metric, the management module is operable to select, from a plurality of inventory holders, the inventory holder storing the inventory item to be stationed at the defined area of the inventory pier. The management module is further operable to receive an order for the inventory item and instruct the mobile drive unit to transport the order holder to the inventory pier. The order holder is operable to receive the inventory item from the inventory holder proximate to the defined area.

U.S. Patent Application Publication 20070017984 to Mountz et al. published Jan. 25, 2007 with the title "Method and system for storing inventory holders", and is incorporated herein by reference. This application describes a method (for storing inventory items in an inventory system) that includes detecting that an inventory holder is available for storage and determining a classification of the inventory holder. The method also includes determining a classification of each of a plurality of storage locations and selecting a storage location for the inventory holder based, at least in part, on the classification of the inventory holder and the classification of the selected storage location. The method additionally includes transmitting information identifying the storage location to a mobile drive unit associated with the inventory holder.

There remains a need for improved systems for inventory management and movement.

SUMMARY OF THE INVENTION

The present invention provides inventory movement (for example, for a fulfillment-automation system used to send goods to customers) with high volumetric utilization of warehouse space and low cost-per-order.

BRIEF DESCRIPTION OF THE DRAWINGS

FIG. 1A is a schematic isometric view of a picker automated vehicle (PAV) 101 according to some embodiments of the present invention.

FIG. 1B is a schematic top view of picker automated vehicle (PAV) 101 according to some embodiments of the present invention.

FIG. 1C is a schematic isometric view of a tote-movement device 120 according to some embodiments of the present invention.

DESCRIPTION OF PREFERRED EMBODIMENTS

Figure 1D:
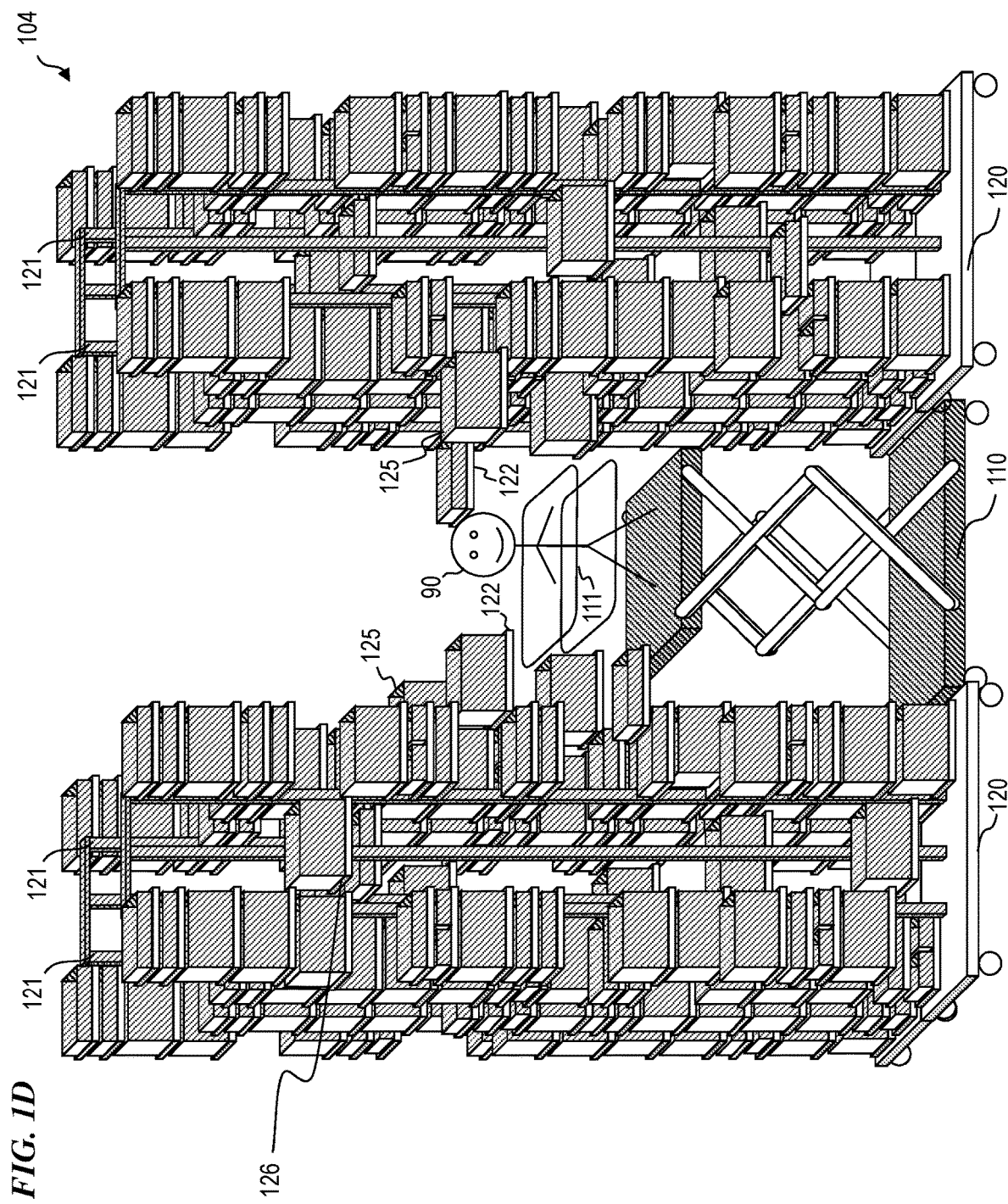
FIG. 1D is a schematic isometric view of a picker automated vehicle (PAV) 104 according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2016-2017, Doerfer Corporation, All Rights Reserved.

FIG. 1A is a schematic isometric view of a picker automated vehicle (PAV) 101 according to some embodiments of the present invention. In some embodiments, a PAV mover unit 110 (carrying and elevating human picker 90 within a safety cage 111) is connected to one or more tote-carrying modular assemblies 120 each carrying a plurality of totes 125 that are held by shelves 122 that can be moved and repositioned horizontally and vertically by elevators 121. In some embodiments, PAV mover unit 110 includes a human-machine interface (such as a video screen and/or laser pointers that indicate to the human picker which items are to be picked from which bins 240 (see FIG. 2A) and then placed in which totes 125. In various embodiments, a plurality of shelves 122 are arranged on a plurality of sides (front-back and/or left-right) of each elevator 121. In some embodiments, a plurality of elevator motion units 126 are provided on each vertical pole of each tote-carrying modular assembly 120.

FIG. 1B is a schematic top view of picker automated vehicle (PAV) 101 according to some embodiments of the present invention.

FIG. 1C is a schematic isometric view of a tote-movement device 120 according to some embodiments of the present invention.

FIG. 1D is a schematic isometric view of a picker automated vehicle (PAV) 104 according to some embodiments of the present invention. In some embodiments, a plurality of elevator motion units (EMUs) 126 (e.g., upper and lower EMUs on both the left and right sides) are provided on each vertical pole of each tote-carrying modular assembly 120.

Figure 2B:
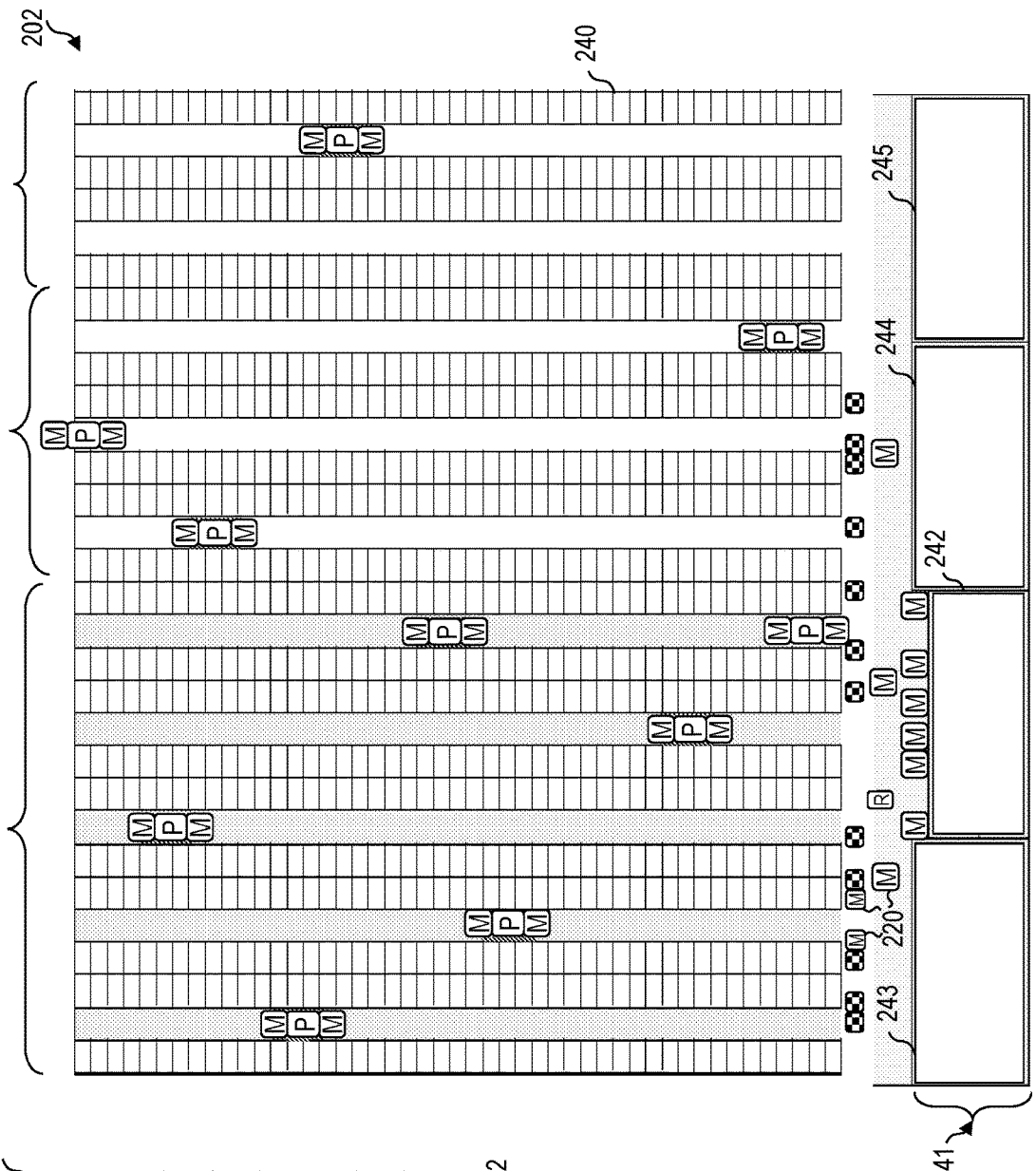
FIG. 2B is a schematic top view of a warehouse 202 using picker automated vehicles (PAVs) 210 and tote-moving modular assemblies (MA) 220 according to some embodiments of the present invention.
Figure 2A:
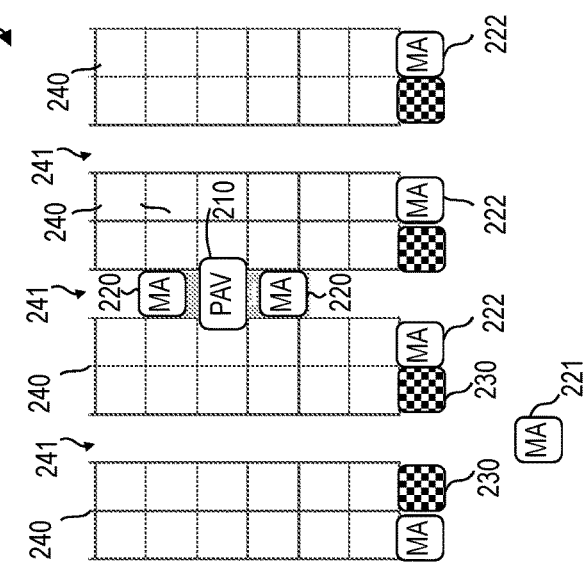
FIG. 2A is an enlarged schematic top view of portion 201 of a warehouse 202 using picker automated vehicles (PAVs) 210 and tote-moving modular assemblies (MA) 220 according to some embodiments of the present invention.

FIG. 2A is an enlarged schematic top view of portion 201 of a warehouse 202 using picker automated vehicles (PAVs) 210 and tote-moving modular assemblies (MA) 220 according to some embodiments of the present invention. In some embodiments, bins 240 are placed along both sides of each aisle 240, and a PAV 210 carries a human picker and is connected to one or more MAs 220 to move along the aisle and to raise and lower the human picker to bins located at various heights along the aisles. In some embodiments, the horizontal and vertical motion and the horizontal-vertical (HV) paths taken by the platform supporting the human picker are automatically chosen by computer algorithm to minimize the time per pick.

FIG. 2B is a schematic top view of a warehouse 202 using picker automated vehicles (PAVs) 210 and tote-moving modular assemblies (MA) 220 according to some embodiments of the present invention.

Figure 3:
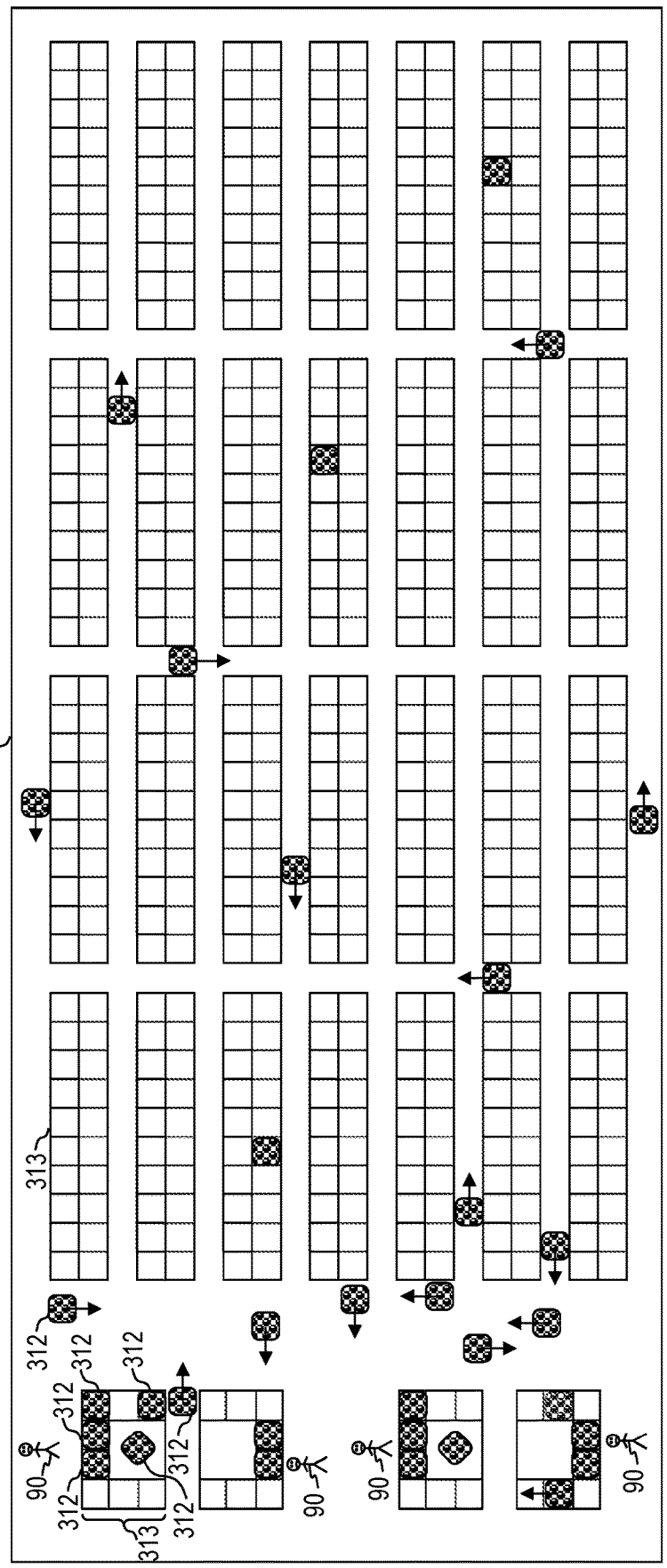
FIG. 3 is a schematic top view of a conventional package-to-picker facility that uses unmanned automated carts 312 to move inventory to fixed-position human operator pickers 90.

FIG. 3 is a schematic top view of a conventional package-to-picker facility that uses unmanned automated carts 312 to move inventory to fixed-position human operator pickers 90. Such conventional systems fetch goods by unmanned robo-carts under container of goods to 4 stationary pickers at end; because robocarts move, containers of goods (bins) are limited in height.

Figure 4:
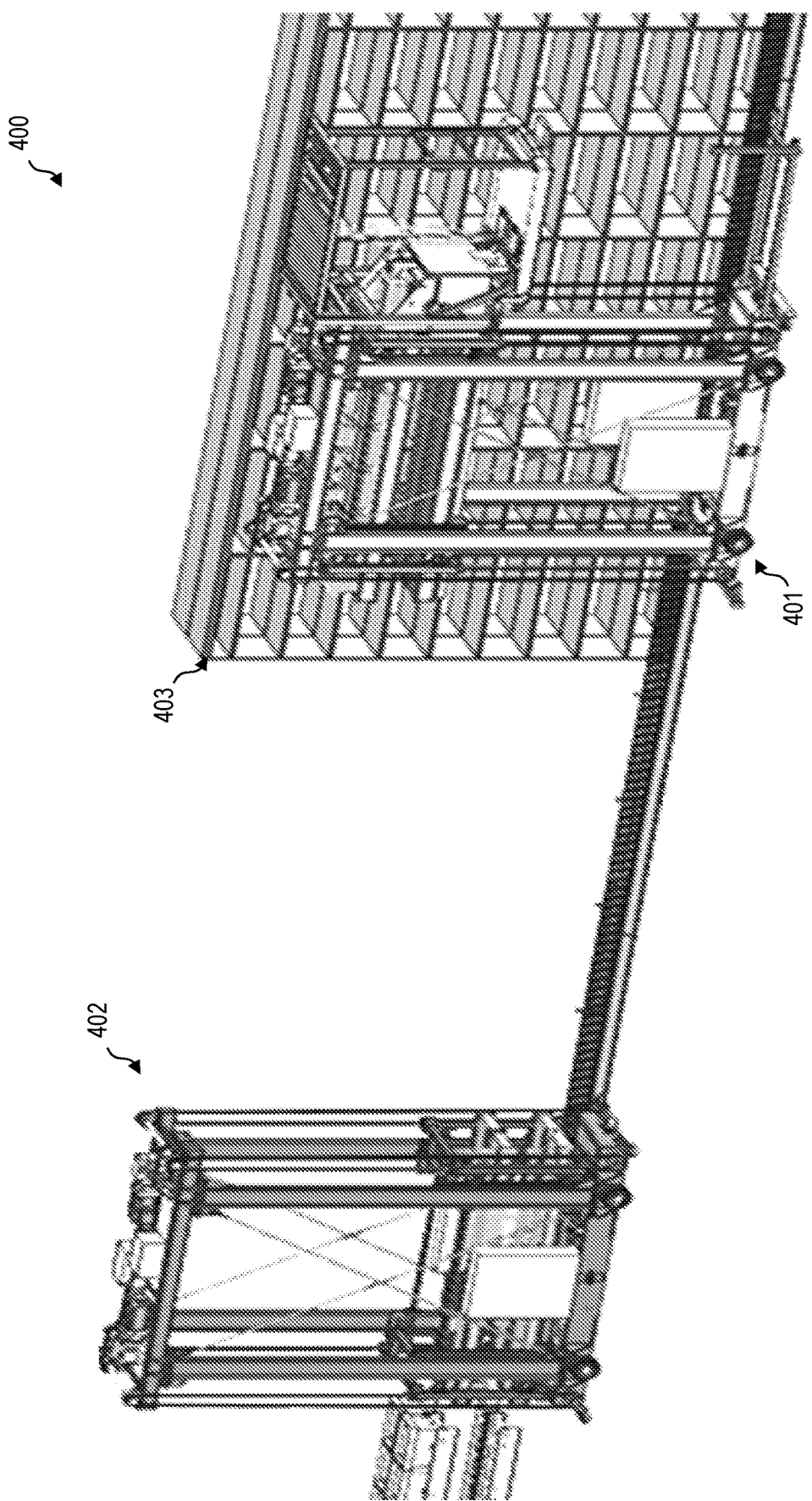
FIG. 4 is a perspective view of a system 400 including a Picker Automated Vehicle (PAV) 401, Tote Shuttle 402, and bins 403, according to some embodiments of the present invention.

FIG. 4 is a perspective view of a system 400 including a Picker Automated Vehicle (PAV) 401, Tote Shuttle 402, and bins 403, according to some embodiments of the present invention.

Figure 5:
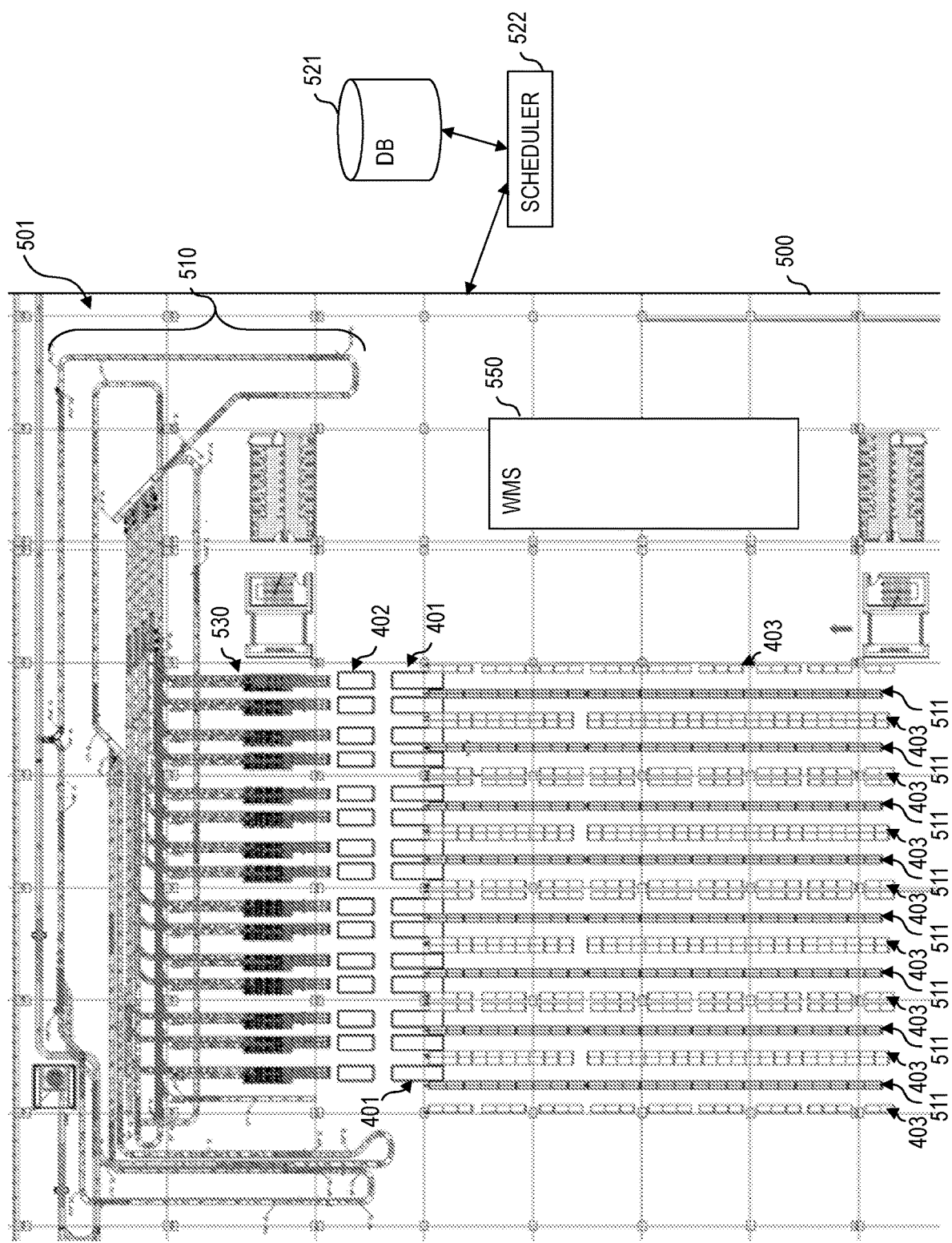
FIG. 5 is a plan view of an FCA warehouse 501, according to some embodiments of the present invention.

FIG. 5 is a plan view of an FCA warehouse 501, according to some embodiments of the present invention. In some embodiments, software and hardware systems implement Database 521 and Scheduler 522 applications that work along with WMS 550 to organize and sort shipment orders so as to minimize the time needed per pick and maximize shipment throughput. In some embodiments, Tote Shuttle system 530 and Tote Shuttles 402 transfer totes between the Configurator 510 and the Picker Automated Vehicles (PAVs) 401. A total inventory of available items is stored in bins 403 and items are picked by human pickers who are automatically conveyed and elevated to selected bins to pick items for each shipment and who place the picked items in preselected totes.

Figure 6A:
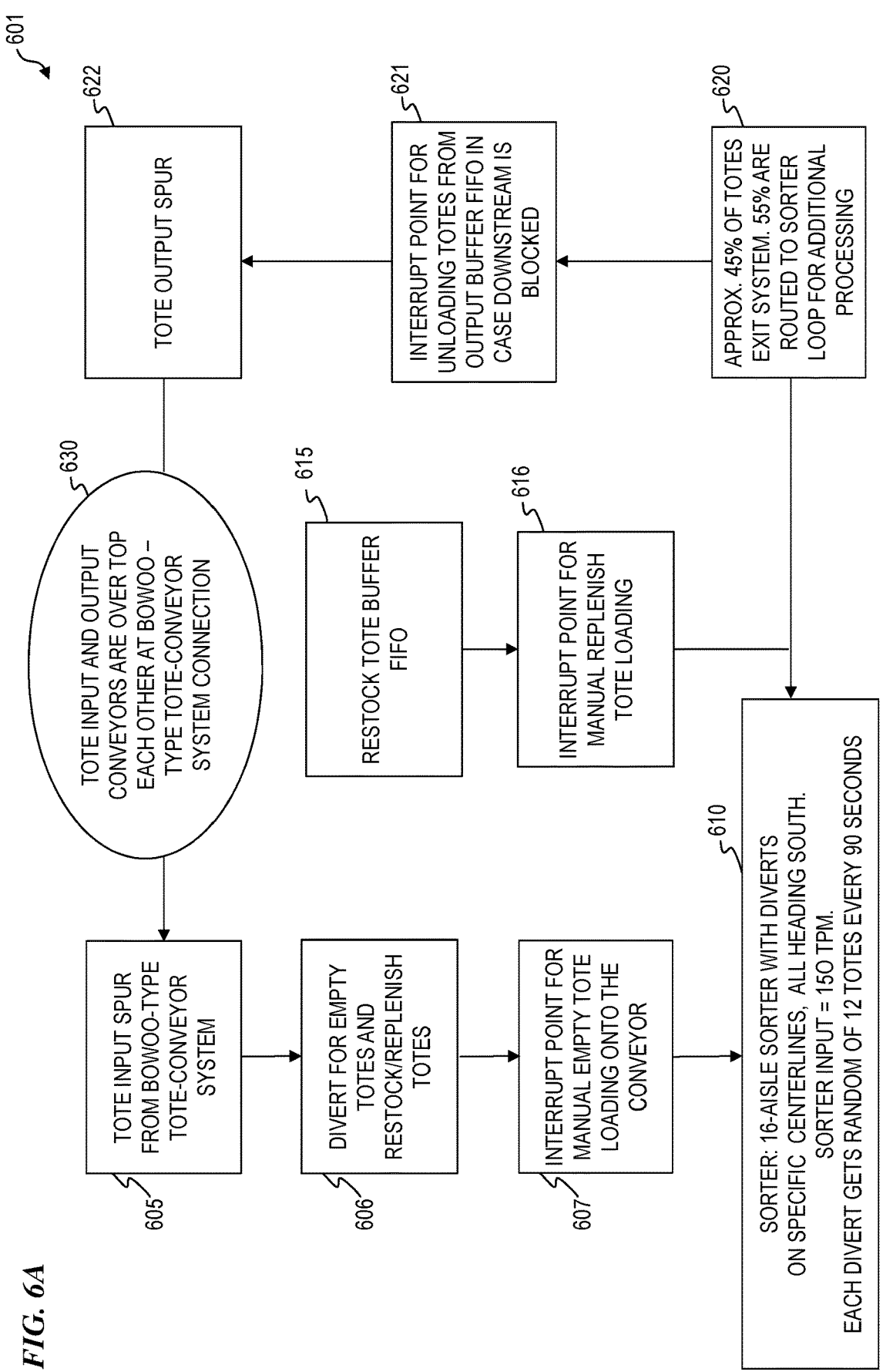
FIG. 6A is a flowchart of a method 601, according to some embodiments of the present invention.

FIG. 6A is a flowchart of a method 601 (which also corresponds to a system that performs the method), according to some embodiments of the present invention. In some embodiments, a tote input spur from the tote-conveyor system is provided at block 605. In some embodiments, at block 606, method 601 includes a divert for empty totes and restocking/replenishing of totes. In some embodiments, an interrupt point for manual empty-tote loading onto the conveyor is provided at block 607. In some embodiments, at block 610, a sorter is provided. In some embodiments, the sorter includes a 16-aisle sorter with diverts on specific centerlines all heading one direction (e.g., south). In some embodiments, the sorter input is equal to 150 totes-per-minute (TPM) (in other embodiments, any other suitable sorter input rate is provided). In some embodiments, each divert gets a random selection of twelve (12) totes every ninety (90) seconds. In some embodiments, at block 615, a restock tote buffer is provided on a first-in-first-out (FIFO) basis. In some embodiments, at block 616, an interrupt point for manually replenishing tote loading is provided. In some embodiments, at block 620, approximately 45% of totes exit the system. In some such embodiments, 55% are routed to the sorter loop for additional processing. In some embodiments, an interrupt point for unloading totes from the output buffer FIFO is provided at block 621 in case downstream is blocked. In some embodiments, a tote output spur is provided at block 622. In some embodiments, at block 630, tote input and output conveyors are one on top of the other at the tote-conveyor connection.

Figure 6B:
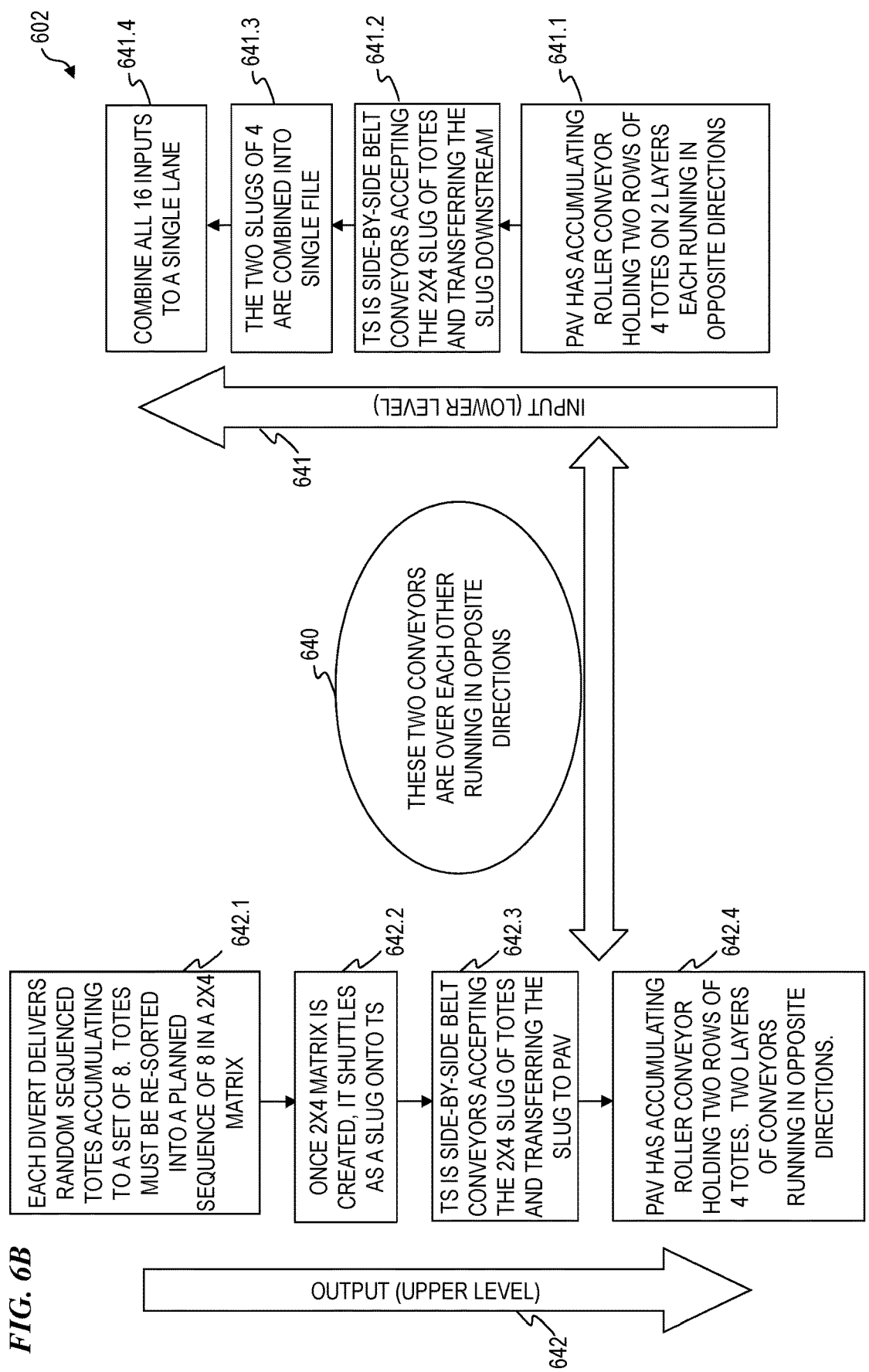
FIG. 6B is a flowchart of a method 602, according to some embodiments of the present invention.

FIG. 6B is a flowchart of a method 602 (which also corresponds to a system that performs the method), according to some embodiments of the present invention. In some embodiments, method 602 includes providing conveyors 640 that are one on top of the other, running in opposite directions. In some such embodiments, conveyors 640 include an input conveyor 641 on a lower level and an output conveyor 642 on an upper level. In some embodiments, there is approximately 31.5 inches between the floor and the drive surface of input conveyor 641. In some embodiments, there is approximately 57 inches between the floor and the drive surface of output conveyor 642. In some embodiments, at block 641.1, the PAV has an accumulating roller conveyor that holds two rows of four (4) totes on two (2) layers each running in opposite directions. In some embodiments, at block 641.2, side-by-side belt conveyors (TS) accept the 2×4 slug of totes and transfer the slug downstream. In some embodiments, at block 641.3, the two slugs of four (4) are combined into single file. In some embodiments, all 16 inputs are combined to a single lane at block 641.4. In some embodiments, at block 642.1, each divert delivers randomly sequenced totes accumulating to a set of eight (8). In some embodiments, totes are re-sorted into a planned sequence of eight (8) in a 2×4 matrix. In some embodiments, at block 642.2, once the 2×4 matrix is created, it is shuttled as a slug onto the TS. In some embodiments, at block 642.3, the TS (e.g., side-by-side belt conveyors) accepts the 2×4 slug of totes and transfers the slug to the PAV. In some embodiments, at block 642.4, the PAV includes an accumulating roller conveyor that holds two rows of four (4) totes. In some such embodiments, the accumulating roller conveyor includes two layers of conveyors running in opposite directions.

In some embodiments, the present invention provides a Fulfillment Center Automation (FCA) solution. The present invention described herein successfully fills a need in the fulfillment/warehouse automation sector by automating a "picker-to-goods" solution that provides performance comparable to or better than that of any other system currently in use, inclusive of Amazon's Kiva automated "goods-to-picker" approach (such as described in U.S. Pat. No. 7,402,018 to Mountz et al., U.S. Pat. No. 7,826,919 to D'Andrea, et al., U.S. Pat. No. 7,850,413 to Fontana, U.S. Pat. No. 7,873,469 to D'Andrea, et al., U.S. Pat. Nos. 7,894,932 and 7,894,933 to Mountz, et al., U.S. Pat. No. 7,912,574 to Wurman, et al., U.S. Pat. No. 7,920,962 to D'Andrea, et al., U.S. Pat. No. 8,220,710 to Hoffman, et al., U.S. Pat. No. 8,239,291 to Hoffman, et al., U.S. Pat. No. 8,311,902 to Mountz, et al., U.S. Pat. No. 8,483,869 to Wurman, et al., U.S. Pat. No. 8,538,692 to Wurman, et al., U.S. Pat. No. 8,649,899 to Wurman, et al., U.S. Pat. No. 8,798,786 to Wurman, et al., U.S. Pat. No. 8,805,573 to Brunner, et al., U.S. Pat. No. 8,831,984 to Hoffman, et al., U.S. Pat. No. 8,965,562 to Wurman, et al., U.S. Pat. No. 8,972,045 to Mountz, et al. U.S. Pat. No. 9,009,072 to Mountz, et al., and United States Patent Application Publication 20070017984 to Mountz et al., each of which is incorporated herein by reference).

The successful automation of a picker-to-goods approach has not been addressed and that is the foundation of the present invention's solution.

While the system performance of the present invention is comparable to or better than that of conventional systems, the present invention addresses other issues that are fundamental weaknesses which exist with the approach of conventional systems. One of the most significant of those is volumetric efficiency. In some embodiments, the present invention is able to make use of every available vertical cubic foot in a warehouse, where as conventional systems are limited to ergonomic work heights at floor level. In addition, conventional systems have limitations relative to high-throughput warehouses like those of the Customer that do not exist with the system of the present invention.

With the added volumetric efficiency provided by the present invention's system, the Customer is able to forego the building of new warehouses that would otherwise be required with more conventional approaches. The present invention is also able to integrate the restocking function into a picker's normal routine. This results in a much more efficient use of personnel since separate stockers are no longer required and no dedicated restock trips are necessary. As a result, the personnel required to operate the present invention is absolutely minimized. This also creates a much more ergonomic solution for pickers compared to a more traditional approach.

In summary, the system of the present invention provides the Customer an optimized state-of-the-art warehouse automation solution that provides immediate inherent benefits over all other systems currently available (inclusive of those utilized under the approach in the above-cited patents and patent application). In addition, the efficiencies gained by implementing the present system will continue to be augmented at the Customer as future system improvements and developments are incorporated.

1. The FCA Performance

After receiving Customer's input during the engineering study, the present system as shown in the layout of FIG. 5 was tailored so that the Fulfillment Center Automation (FCA) will process 66,800 shipments per day at peak rate with all ratios and shipment timing profile similar to that shown in the prototypical dataset. This statement is based on the following assumptions.

100,000 SKU's with SKU distribution similar to that seen in the prototypical dataset.
    15 aisles with an optional 16th aisle
    8 tote sorties (2×4 slug matrix)
    The 1,340 totes/hour limit on incoming and outgoing tote conveyors will not hinder the system
        Customer must staff the replenishment and problem-solving areas appropriately and respond in a timely manner to any blocked or starved condition.

2. The FCA Process

This section describes the key processes that implement the FCA (fulfillment center automation) function.

Warehouse Management System

The Warehouse Management System (WMS), supplied by Customer, interfaces with the FCA via a web-based interface. The interface is bi-directional and handles all interaction between the two subsystems. The primary functionality provided through this interface is as follows:

WMS supplies SKU information (dimensions, weight, description, image, velocity, etc.) to the FCA.

WMS 'downloads' shipment orders to the FCA for it to fulfill.

WMS provides tote status and data for totes entering the FCA.

FCA updates the WMS on bin usage (SKUs and SKU quantity in each bin).

FCA updates the WMS as tote status and data changes occur within the FCA.

FCA updates the WMS as shipment statuses change.

FCA requests unique batch ID's from the WMS each time a batch is created.

Pick Process Description

The PAV has two incoming conveyors. At the end of each conveyor is a mechanism that presents each incoming tote to the human operator and also transfers each outgoing tote to the outgoing conveyor below. There is a tote barcode scanner at each mechanism. There is also a lighted touch-switch (zero force capacitive switch) next to each mechanism.

The PAV will index an incoming tote onto the mechanism.

The barcode will be scanned and the tote information looked up in the plan data. The tote information will include the type of tote (e.g., shipment, restock, unload), human-centric bin designation, bin X/Z coordinates, SKU, quantity, and any additional data required for the PAV operation.

Note that there are two tote mechanisms so while the human operator is working on one tote, the other tote is typically being brought in and scanned. Thus, the data for the next tote is typically known before the human operator completes work on the current tote.

If the next bin location requires PAV motion, the PAV will do the following:

The system will indicate the upcoming motion to the human operator in several ways, simultaneously.

The bin designator for the next bin will be displayed visually on the Human-Machine Interface (HMI).

The general direction and distance of the motion will be indicated on the HMI. (The Figures (e.g., FIG. 1A and FIG. 4) show a side view of the PAV and display a big arrow at roughly the angle of motion.)

The human operator will initiate the motion by grasping both hold-to-run handles and both feet on each of two sensor mats. This is the operator's acknowledgement that they have their body away from the bins, are in a stable stance, and otherwise prepared for the motion.

Both hold-to-run handles must remain grasped and both feet in place through the completion of the motion or the PAV will stop.

The PAV will indicate the next pick, stow, or unload action to the human operator in several ways, simultaneously.

The tote (left or right) will be identified by turning on an indicator light next to the tote.

The HMI will display the action to be performed, giving full detail, including:

Indicator for left or right tote.

Action to perform (e.g., Pick, Unload, Stow).

SKU identifier.

SKU description.

SKU image.

Quantity ("ALL" for Unload).

Bin designator.

The human operator will perform the requested action.

Note that in the case of a pick or stow, the human operator may use the HMI to indicate a quantity less than the requested quantity prior to indicating that the action was completed. This is discussed further in the section on exception handling.

The human operator will verify that they operated on the correct tote in either of two ways:

By touching a capacitive (zero force) switch next to that tote.

By touching the tote indicator on the HMI.

This is also the signal to the PAV that this tote can be moved to the outgoing conveyor.

The other tote should already be in position, so as soon as the human operator indicates that the action is completed, the PAV will initiate the next action in the sequence (move or human-operator action).

Outbound Totes

A tote will exit the system if any of the following conditions are met:

Any shipment within the tote is approaching Critical Pull Time (CPT) and must exit in order to make it to pack-out in time.

The tote has reached the maximum fill limit by volume.

The tote has reached the maximum fill limit by weight.

Totes exit onto an outgoing tote buffer conveyor that connects to the tote outgoing conveyor.

A manual load/unload 'stop' on the buffer conveyor can be used to remove totes if the buffer is overrun with too many outgoing totes and to reintroduce those totes once the overrun condition has been relieved.

Restock, Replenishment and Problem-Solving Spurs

Inbound restock

Restock totes will be delivered to the FCA from the first floor via the tote conveyor (such as a conveyor available from Bowoo System Corporation of Korea (see bowoosys.koreasme.com/en/index.html).

Restock totes will be diverted to a buffer conveyor that connects to the configurator.

A manual load/unload 'stop' on the buffer conveyor can be used to remove totes if the buffer is overrun with too many restock totes and to reintroduce those totes once the overrun condition has been relieved.

Replenishment

Replenishment reserve pallets will be delivered to the fourth floor via the elevators and staged near the FCA.

Operators will utilize the manual load/unload 'stop' on the incoming empty tote buffer conveyor to retrieve empty totes as needed.

Operators will load replenishment stock into these empty totes and use a customer-supplied tool to associate the replenishment SKU's and quantities with the tote.

The replenishment totes will be loaded into the FCA via the manual load/unload 'stop' on the restock buffer conveyor.

Empty totes

Empty totes will be delivered to the FCA from the first floor via the tote conveyor.

Empty totes will be diverted to a buffer conveyor that connects to the configurator.

A manual load/unload 'stop' on the buffer conveyor can be used to remove totes if the buffer is overrun with too many empty totes and to reintroduce those totes once the overrun condition has been relieved.

No-read and problem-solving spur

Any tote within the FCA with an unreadable barcode or which has been marked as a 'problem tote' will be diverted to this spur.

The human operator will scan the tote barcode and will be presented with all known information about the tote.

For totes that contain damaged/reject product, the human operator will unload the product, ensure the tote is clean, and reintroduce the now empty tote to the FCA using the manual load/unload 'stop' on the empty tote buffer conveyor.

For any tote that is not being emptied, the human operator will address the problem, update the tote status via a customer-supplied tool, and then reintroduce the tote to the FCA using the manual load/unload 'stop' on the restock tote buffer conveyor.

5. FCA System Technical Description

In some embodiments, the FCA system includes basic mechanical mechanisms controlled by proprietary software creating an efficient process of order fulfillment. In some embodiments, the FCA system includes the following:

Database

This sub-system is the core of the FCA. Its major software components are the database, the FCA application itself and a web server.

Functionality:

Maintains local knowledge of bin data. This data includes bin type, SKU's, and quantity of each SKU.

Maintains local knowledge of shipments and restock/replenishment.

Maintains local knowledge of tote data. This data includes tote status, SKU's, and quantity of each SKU.

Manages the relationship between totes and the operations that are to be performed (i.e., picks and stows).

Forms and manages batches as directed by the Scheduler application.

Provides a system interface via web services. The web server is the interface to the other FCA sub-systems and to the outside world (e.g., the WMS).

Interacts with the WMS to keep both systems updated on bin, tote, and shipment status/data.

Keeps performance and loading statistics about the system.

Implementation:

The database application is built in SQL Server.

The database server is built as a pair of redundant servers, providing failover capability.

The FCA application is built using an ASP.NET Core application hosted on IIS as the web server.

Scheduler

This sub-system is responsible for planning how and when all operations (e.g., picks and stows) are to be performed.

Functionality

Looks at all known outstanding operations (e.g., picks and stows), all bin data, and all applicable tote data and forms the most efficient plan that it can to perform those operations. The plan determines the order (sequence) and timing of the operations as well as where (bin) the operations are to be performed and which tote is to be used.

Determines what operations can be combined into batches in order to improve overall system efficiency, in terms of both throughput and tote utilization. This primarily combines pick operations to maximize average tote utilization (i.e., to maximize product volume per tote) while accommodating other system constraints (e.g., meeting CPT's).

Implementation

The core functionality of the scheduler is written as a number of genetic solver algorithms. These operate by generating a set of possible plans, taking the top 'n' best plans, and then mutating each of these plans to form the next generation. The process repeats continuously, driving toward the optimal plan, and evolving as the real-world situation evolves.

The scheduler is written to be highly parallel, with many instances of the same processes spread across many physical and virtual CPU cores.

Configurator

This sub-system is responsible for controlling tote movements according to the plans provided by the Scheduler.

Functionality

Requests aisle-specific plan information from the scheduler for each aisle and routes the appropriate totes to those aisles to fulfill the plans.

Re-orders totes within each sortie (group of totes intended to make up one load for the tote shuttle) according to the sequence specified in the plan.

Manages injection of empty and restock totes into the main configurator loop according to the current/anticipated needs of the system.

Implementation

State-based machine logic written in Beckhoff TwinCat structured text, running as a hard real-time process within the TwinCat runtime.

Beckhoff industrial PC hardware.

Conveyor system

Buffers, sequences, and distributes totes to the PAV aisles utilizing various standard material handling technologies. The totes received from the PAV's are then either routed to another aisle or sent to packout.

Tote Shuttle

Tote Shuttles transfer totes between the configurator and the PAV's.

Functionality

Receives a 'sortie' of unprocessed totes from the configurator and returns a load of processed totes to the configurator.

Looks ahead to determine the best place and time to couple with the PAV.

At the appropriate time, executes an approach move to bring itself close to the PAV. Then executes coupling move when the PAV is in the planned coupling position.

Transfers a sortie of unprocessed totes to the PAV and receives processed totes from the PAV.

Uncouples from the PAV and returns to the configurator to repeat the process.

Implementation
  State-based machine logic written in Beckhoff TwinCat structured text, running as a hard real-time process within the TwinCat runtime.
  Beckhoff industrial PC hardware.

PAV
  PAV's position the human operator and the totes according to the sequence specified in the scheduler plan.
  Functionality
    Reads the barcode on each tote.
    Interfaces with the FCA database to verify/retrieve the necessary tote, bin, and SKU information.
    Positions the cab so that the human operator has access to the specified bin(s).
    Directs the human operator to perform the required operation(s) related to the tote being processed.
    Performs data updates to reflect the completed operations, including exception handling.
  Implementation
    State-based machine logic written in Beckhoff Twin-Cat structured text, running as a hard real-time process within the TwinCat runtime.
    .Net HMI application running as a non-real-time process on the same controller PC.
    Beckhoff industrial PC hardware.

Utility Requirements
Power requirements are estimated as follows. It will be reviewed and confirmed when the contract is in place.
Customer will provide power drops to the appropriate main enclosures
  One at the end of each aisle
  One at the main enclosure for the configurator
General Power Requirements Estimate for the FCA System
  Date specified
Per Picker Automated Vehicle (PAV)

| QTY | Amps Each | Total Amps | Device(s) |
|---|---|---|---|
| 2 | 25.8 | 51.6 | Traction (X Axis) Servo Drives |
| 2 | 28.5 | 57 | Operator/Conveyor (Z Axis) Lift Servo Drives |
| 1 | 10 | 10 | Tote Tilt Loading Mechanism Servos (2 motors on 1 Drive) |
| 1 | 7.6 | 7.6 | Human Operator Area Heater |
| 1 | 2.65 | 2.65 | 380VAC to 120VAC transformer |
| 1 | 17 | 17 | Conveyor System |
| 1 | 2 | 2 | 24VDC Power Supply |
| 1 | 7.5 | 7.5 | Miscellaneous Power Consumers Including Safety Factor |
|  |  | 155.5 | Approximate Total 380VAC Power in Amps |

Per Tote Shuttle Vehicle

| QTY | Amps Each | Total Amps | Device(s) |
|---|---|---|---|
| 2 | 25.8 | 51.6 | Traction (X Axis) Servo Drives |
| 2 | 25.8 | 51.6 | Conveyor (Z Axis) Lift Servo Drives |
| 1 | 2.65 | 2.65 | 380VAC to 120VAC transformer |
| 1 | 17 | 17 | Conveyor System |
| 1 | 2 | 2 | 24VDC Power Supply |
| 1 | 7.5 | 7.5 | Miscellaneous Power Consumers Including Safety Factor |
|  |  | 132.5 | Approximate Total 380VAC Power in Amps |

Per Aisle

| QTY | Amps Each | Total Amps | Device(s) |
|---|---|---|---|
| 1 | 2.65 | 2.65 | 380VAC to 120VAC transformer |
| 1 | 2 | 2 | 24VDC Power Supply |
| 1 | 2.5 | 2.5 | Miscellaneous Power Consumers Including Safety Factor |
|  |  | 7 | Approximate Total 380VAC Power in Amps |

Total Power Estimate for the Aisles and Equipment including the Configurator Sections

| QTY | Amps Each | Total Amps | Device(s) |
|---|---|---|---|
| 16 | 155.5 | 2488 | PAV Power Requirements |
| 16 | 132.5 | 2120 | Tote Shuttle Vehicle Requirements |
| 16 | 7 | 112 | Aisle Power Requirements |
| 1 | 540 | 540 | Approximate Power needs for the Configurator |
|  |  | 5260 | Approximate Total 380VAC Power in Amps |

Compressed Air
  Customer will provide clean, dry compressed air at a rate of _CMM (_CFM) @_MPa (_PSI).
    NOTE: This data will be confirmed prior to contract signing.
  Customer will plumb the air to a designated location adjacent to the configurator.

Server
  Customer will provide a climate controlled room for the FCA hardware

Labor Estimates
Labor estimates for the FCA are initially planned at 21 people per shift and set as follows. (notated per shift)
  3 Replenishment, Empty tote and restock tote management and problem-solving area (average ranging from 3-5)
  16 PAV operators
    Note that some operators on the PAV may be sensitive to the repeated stop/go motion experienced during normal operation. They may want to rotate to other stationary tasks in the FC. This is a personal preference situation and the rotation process should be determined by Customer's labor leadership team.
  1 System technician
    1 Maintenance/repair technician 6. FCA Development and Engineering Study An engineering study was conducted to validate the early concepts and ideas of the picker-to-product concept. The study contained two parallel courses of action, development of the mechanical design and development of the software. The mechanical development included several prototyping efforts. The software development utilized simulation activities and the creation of a testbed which, driven by real data provided by Customer, mirrored real-world order/shipment patterns as well as tote flow on the configurator conveyors.

Testbed

The testbed incorporates the actual FCA database, scheduler, and PLC logic, along with simulated conveyor and vehicle hardware to provide a fully operational system for use in both testing functionality and evaluating performance.

Functionality

The core software functionality is provided by the actual applications and so this functionality is as described in the related sections above.

Configurator hardware simulation PLC code mimics the timing of tote motions based on the real conveyor speeds and timing as provided by the manufacturer.

PAV and tote shuttle hardware simulation PLC code mimics the tote motions as with the configurator, but also mimics the timing, speed, and position feedback of the servo motors.

Human Operator interaction is simulated using functions that calculate the operation completion time based on a number of variables including the number of items being picked/stowed and the number of SKU's mixed in the source and target bins and totes. These calculations were derived based on empirical data from trials performed within a PAV and aisle mock-up.

Implementation

The Applicant is running the real scheduler application on the actual scheduler server hardware, the real FCA database application on the actual FCA server hardware, and the actual PLC code within TwinCat.

The physical configurator, PAV and tote shuttle hardware are simulated by temporary low-level PLC code that mimics the IO responses and timing that the Applicant expects from the actual hardware.

The WMS is simulated by a .Net application that generates shipments and restock according to statistical data gathered from the prototypical data sets. It very closely mimics the timing and nature of the shipments, with each day of the week having its own distinct profile. The WMS simulator also gathers statistical data for analysis of performance.

In some embodiments, a visualization application, written in .Net, provides a visual representation of individual tote, PAV, and shuttle motions; and also gathers statistical data for analysis of performance.

Mechanical Prototypes

As part of the engineering study several prototypes were constructed.

PAV Picker Platform

A prototype included two sets of opposing shelves and a simulated PAV on caster wheels to mimic a PAV aisle. It was used to develop the picking process, tact time and basic ergonomic design of the picker platform. It was placed in a simulated aisle to conduct various timing studies of the picking process to understand and refine the process of picking SKU's into the totes. Although simplistic in design and construction this prototype proved to be very valuable.

Tote Tilt

This mechanism is used on the PAV to present totes to the picker. This prototype was used to develop both how totes are presented to the picker as well as validate the mechanical design. Testing this was instrumental in determining how the depth of SKU's in the tote are affected by the angle of the tote when it exits.

Fulfillment Center Automation System Functional Specification

This functional specification provides a high-level description of the functionality to be provided by the System-as-a-Whole (SAAW) portion of an automated fulfillment center. This functional specification also establishes a common set of terminology for use in further documentation and communication regarding the SAAW and its functionality. Additional design documentation provides further detail to guide the customer's interface implementation. The size, weight, numbers, combinations of features, and the like as specified herein represent parameter values for some embodiments. Other embodiment may use different values.

1.0 System Overview

In some embodiments, the Fulfillment Center Automation (FCA) system downloads specifications for shipment orders (i.e., order information that defines Stock-Keeping Units (SKUs) that are to be shipped in each one of a plurality of shipments to be made to customers) from the Warehouse Management System (WMS) and fulfills those shipments from the available stock within the FCA warehouse while meeting required shipment times. The FCA system also handles restock and replenishment.

FIGS. 4A and 4B are orthographic-projection views is a perspective view of a Picker Automated Vehicle (PAV) 401, Tote Shuttle 402, and bins 403, according to some embodiments of the present invention.

FIGS. 5A and 5B are is a plan views of an FCA warehouse 501, according to some embodiments of the present invention.

1.1 In some embodiments, SAAW 500 includes the following major subsystems:

1.1.1 Configurator 510 for some embodiments 1.1.1.1 This refers to the collection of conveyors that receives empty and restock totes from the Fulfillment Center (FC), configures sorties of totes to be processed within the aisles, and delivers completed totes back to the FC for re-bin and pack-out.

1.1.2 Database 521 and Scheduler 522 for some embodiments 1.1.2.1 These software applications interface with the WMS to receive shipment orders, develop plans for efficient processing of picks and stows, and maintain system knowledge of bin and tote status/data at all times. These applications also automatically manage the slotting of Stock-Keeping Units (SKUs) to bins within the FCA-controlled portion of the warehouse in a way that optimizes overall efficiency and throughput.

1.1.3 Tote Shuttle 530 for some embodiments 1.1.3.1 Tote Shuttles 402 transfer totes between the Configurator 510 and the Picker Automated Vehicles (PAVs) 401.

1.1.3.2 Functionality for some embodiments 1.1.3.2.1 Receives a 'sortie' of unprocessed totes from the Configurator and returns a load of processed totes to the Configurator.

1.1.3.2.2 Looks ahead to determine the best place and time to couple with the PAV.

1.1.3.2.3 At the appropriate time, executes an approach move to bring itself close to the PAV and then executes a coupling move when the PAV is in the planned coupling position.

1.1.3.2.4 Transfers a sortie of unprocessed totes to the PAV and receives processed totes from the PAV.

1.1.3.2.5 Uncouples from the PAV and returns to the Configurator to repeat the process.

1.1.3.3 Implementation used for some embodiments 1.1.3.3.1 State-based machine logic written in Beckhoff TwinCat (see www.beckhoff.com/english.asp?twincat/ default.htm) structured text, running as a hard real-time process within the TwinCat runtime.

1.1.3.3.2 Beckhoff industrial PC hardware.

1.1.4 Picker Automated Vehicle (PAV) 401

1.1.4.1 PAV's position the operator and the totes according to the sequence specified in the scheduler plan.

1.1.4.2 Functionality for some embodiments 1.1.4.2.1 Reads the barcode on each tote.

1.1.4.2.2 Interfaces with the FCA database to verify/retrieve the necessary tote, bin, and SKU information.

1.1.4.2.3 Positions the cab so that the operator has access to the specified bin(s).

1.1.4.2.4 Directs the operator to perform the required operation(s) related to the tote being processed.

1.1.4.2.5 Performs data updates to reflect the completed operations, including exception handling.

1.1.4.3 Implementation for some embodiments 1.1.4.3.1 State-based machine logic written in Beckhoff TwinCat structured text, running as a hard real-time process within the TwinCat runtime.

1.1.4.3.2 .Net HMI application running as a non-real-time process on the PC controller.

1.1.4.3.3 Beckhoff industrial PC hardware.

2.0 Terminology for Some Embodiments 2.1 Aisle 511—The space between two storage racks in which the picker operates. Two aisle faces are exposed to the picker when the picker is within an aisle.

2.2 Allocated Items—Items in specific bin locations that are allocated to pick requests or unload requests in the current plan. These Items are essentially off limits when planning subsequent picks or unloads.

2.3 Bin Data—Data managed by the FCA 501 that identifies what SKU is associated with each bin location. This includes the quantity of each SKU at each bin location. It also includes the aisle, the aisle face, bin type, and the X, Z coordinates of the bin within the aisle face, with (0, 0) being the bottom corner of the aisle face nearest the configurator.

2.4 CPT—Critical Pull Time—This is the WMS-supplied Ship Date minus the Packout Delay and represents the last possible moment that the fulfilled shipment should leave the 4th floor.

2.5 Configurator 510—A system of conveyors that manages totes and routes them to spur conveyors in order based on the plan produced by the Scheduler.

2.6 Drop Time—Date/Time at which a shipment is available for download from the WMS to the FCA.

2.7 FCA—Fulfillment Center Automation (FCA) system 501—Refers to the SAAW system that downloads shipments from the WMS, interacts with the Scheduler to schedule fulfillment, tracks local bin data and tote data, and keeps the WMS updated. It also essentially acts as the communications hub between the PLC's, FCA database, Scheduler, and WMS. The term FCA is also used to refer to the fulfillment center automation in its entirety (i.e., including all physical hardware).

2.8 Inbound Restock—Stock that is moved directly from the receiving area to the pick areas without being buffered in the reserve area.

2.9 Item—A single unit/piece of a given SKU.

2.10 Left/Right—When used in reference to PAV sides, aisle faces, and configurator spurs, 'left' and 'right' are as viewed by the operator in the PAV when facing the configurator.

2.11 Minimum Guaranteed Shipment Lead Time—This is the minimum shipment lead time that the system is able to handle under normal conditions (i.e., when the entire system is running normally and is fully staffed with qualified operators).

2.12 Order—A K1 customer creates an order which the WMS breaks into one or more Shipments. Orders are only handled at the level of the WMS and are not downloaded to the FCA.

2.13 Pack-out Delay—Configurable delay time representing the estimated amount of time from when a fulfilled shipment exits the FCA to when it should arrive at the truck (i.e., inclusive of all conveyor travel time and pack-out operations).

2.14 Pick Request—A request that specifies a number of Items of a particular SKU that are to be picked for a shipment.

2.15 PAV—Picker Automated Vehicle—Picker 'cab' and its associated drive mechanism that transports and positions the operator within an aisle.

2.16 Restock Request—A request to stow a number of Items of a given SKU into the system. This generic term covers both Inbound Restock from the receiving area and Replenishment from the reserve area.

2.17 Replenishment—Stock that is held in the reserve area and moved to the pick areas upon request from the WMS.

2.18 Request or Request Record—Used to refer to Pick, Restock, and Unload requests that originate from the WMS and essentially make up the list of tasks that the FCA must complete.

2.19 Reserve—Floor area where replenishment stock is queued.

2.20 Scheduler—SAAW application that takes the list of current pick requests, restock requests, and unload requests and schedules them to configurator spurs/PAV's.

2.21 Shelving Unit—An assembly that includes framework and shelves extending from the floor to the full rack height. Shelving units are placed side by side to form an aisle face.

2.22 Ship Date—Date and time supplied with each WMS shipment record that represents the time at which the shipment must arrive on the shipping dock.

2.23 Shipment—One or more Pick requests that are intended to be placed into a single shipping box.

2.24 Shipment Lead Time—This is the amount of time from shipment Drop Time to shipment CPT.

2.25 System as a whole (SAAW)—In the document below, the general term 'SAAW' will be used to refer to the system as a whole (i.e., FCA, Scheduler, Configurator, Tote Shuttles, PAV's, etc.).

2.26 Tote—Plastic tote is 600 mm long×400 mm wide×323 mm tall at the rim with a 505 m long×335 mm wide footprint. Tote capacity is 35 kg. Totes can be nested.

2.27 Tote Shuttle—Mechanism that shuttles totes between the configurator and the PAV.

2.28 Unload Request—A request to pick a number of Items of a given SKU from a bin location, and which is not associated with a shipment. This might be used to remove a SKU from a bin in preparation for slotting a different SKU to that bin.

2.29 WMS—Warehouse Management System (WMS) 550—Refers to the customer-supplied system that manages shipments, maintains SKU definitions, handles restock and replenishment, and provides problem-solving functionality.

3.0 Facility/Site Accommodations 3.1 Electrical Power 3.1.1 Power: 380 VAC 3-phase delivered via Wye connection. The Wye is required by the servos.

3.1.2 Customer will provide power drops to the appropriate main enclosures
  3.1.2.1 One at the end of each aisle
  3.1.2.2 One at each of three main enclosures for the Configurator
3.1.3 Power Requirements Estimate for the FCA System
  3.1.3.1 The power estimates reflect the SAAW running at full power under worst-case operational scenarios. The SAAW anticipates a significant power savings will be experienced once the FCA is running in normal operation and optimized for the application. Based on reviewing the results from simulations and realistic expectations of FCA operations, the SAAW is currently estimating normal running conditions may only require 3,500 amps of current at 380 VAC. During the summer months, when the heaters are not in use, current usage is anticipated to be slightly less, approximately 3300 amps.
3.2 Compressed Air
  3.2.1 Customer will provide clean, dry compressed air at a rate of 40.5 CFM @60 PSI.
    3.2.1.1 NOTE: This data will be confirmed prior to contract signing.
    3.2.1.2 Customer will plumb the air to a designated location adjacent to the Configurator.
3.3 Controls Infrastructure
  3.3.1 Server room with adequate cooling
  3.3.2 UPS power
  3.3.3 Rack
  3.3.4 Network infrastructure (managed switches, cabling) to connect from our FCA database server (downstairs) up to a switch at the line (upstairs).
  3.3.5 K1 managed switch should isolate the FCA/Configurator network traffic from all other plant network traffic.
3.4 Aisles
  3.4.1 Clear vertical space from floor to top of PAV: 5.25 m
  3.4.2 Height of shelving: 5.0 m
  3.4.3 Open space between aisle faces: 1.6 m
3.5 Environmental
  3.5.1 Temperature: 0-40° C. (32-104° F.)
3.6 Maintenance Crib
  3.6.1 It is recommended that Customer purchase the maintenance crib and spare parts inventory. The crib would include the following.
    3.6.1.1 Fencing for 10×20 meter work area
    3.6.1.2 Shelving for spare parts
    3.6.1.3 Work benches, vises & various hand tools
    3.6.1.4 Basic power tools—drill, impact wrench, etc.
    3.6.1.5 Two advanced laptops running TwinCAT 3.1 software
    3.6.1.6 Multi-meter, oscilloscope, crimpers & other miscellaneous electrical tools
    3.6.1.7 Does not include a fork lift or other lifting device for component material handling.
  3.6.2 Spare parts inventory
    3.6.2.1 At the time of order, SAAW will provide Customer with a recommended spare parts list. These spare parts will be securely stored in the maintenance crib for quick repair of the FCA equipment.
4.0 Top-Level System Functional Requirements
4.1 System is to handle only small Items that will fit into the specific bin sizes and totes that have been identified for use in this system.
  4.1.1 No Items requiring refrigeration.
  4.1.2 No drugs (i.e., no life-threatening ramifications to getting a shipment wrong).
  4.1.3 No hazardous Items/materials.
4.2 System will handle shipments (each made up of one or more pick requests), restocks, and unload requests.
4.3 Shelving units will all be of type B or type D.
  4.3.1 Shelf vertical spacing may be adjusted to match the various bin types being used.
  4.3.2 Only one bin type may be used within any given shelf.
  4.3.3 The number of bins on a shelf will always be either 1 (entire shelf is 1 'bin') or the maximum number of bins for the given bin type.
5.0 System Functional Description
5.1 FCA & Scheduler Functionality
  5.1.1 The system will maintain local records for:
    5.1.1.1 Active Shipments and their underlying Pick requests.
    5.1.1.2 Active Restock requests.
    5.1.1.3 Active Unload requests.
    5.1.1.4 Tote status
    5.1.1.5 Current tote sequencing plan.
    5.1.1.6 Bin data, including SKU assignments and SKU quantities
  5.1.2 Request records will include the original data as provided by the WMS plus additional status information as required by the scheduler, configurator, and PAV's.
  5.1.3 As the WMS receives orders, it will divide each order into some number of shipments and will notify the FCA of the shipments that the FCA is to fulfill.
  5.1.4 For inbound restock from receiving and replenishment restock from reserve, as the restock items are loaded into totes that are destined for the FCA, the WMS will notify the FCA of the restock tote, providing the location at which it was loaded (so that travel time can be predicted), the timestamp at which the tote was released onto the conveyor, the tote ID, the SKU(s), and the quantity for each SKU.
  5.1.5 The FCA will maintain bin data, which includes SKU to bin assignments, bin type, current quantity of each SKU in each bin, and the bin X, Z coordinates within the aisle face.
    5.1.5.1 Note that not all bins will have SKU's assigned. These unassigned bins will be used to support dynamic SKU assignments as needed. More detail is given in the bin data discussion.
  5.1.6 The scheduler will continuously analyze all current active shipment, unload, and restock request records, in combination with the bin data and the currently existing tote sequencing plan. This analysis will produce a new tote sequencing plan that encompasses all aisles/PAV's and evolves as needed to allow for the changing state of the overall system status and inputs.
    5.1.6.1 The overall goal of the scheduler will be to come up with a plan that results in a high overall throughput while not violating any hard constraints (e.g., CPT).
    5.1.6.2 The list of 'active' requests to be analyzed includes all outstanding requests that have not yet been fulfilled, including those already existing in the tote sequencing plan.
    5.1.6.3 At each point in the analysis, the SKU quantity remaining in each bin will take into account the current quantity and all pick requests, unload requests, and restocks that exist in the sequence being analyzed.
    5.1.6.4 As shipment and unload requests are downloaded from the WMS, special status changes such as cancelling an order, etc. will be taken into account in the tote sequencing plan.
    5.1.6.5 The scheduler will know what totes are currently physically on the PAV, on the tote shuttle, and in the queue lanes for a given aisle.

5.1.6.5.1 Empty totes can be used to fulfill any new shipment request.

5.1.6.5.2 A restock tote that is emptied by the operator will be released back onto the configurator and will be used as an empty tote.

5.1.6.6 The 'rules' being applied by the scheduler in its analysis can be thought of as two basic types, 'constraints' and 'optimizations'.

5.1.6.6.1 Constraints are generally logical conditions that are applied to determine if a solution is valid or not.

5.1.6.6.2 Optimizations are generally used in mathematically comparing solutions to find the 'better' solution out of multiple possible solutions.

5.1.6.7 Constraints will include consideration of the following:

5.1.6.7.1 A restock must be sequenced ahead of a pick request that would take the SKU quantity below zero.

5.1.6.7.2 A given tote cannot be in two aisles at the same time. More specifically, the aisle to aisle timing must take into account the expected aisle to aisle travel time for the tote.

5.1.6.8 Optimizations will include consideration of the following:

5.1.6.8.1 The time that it takes to complete PAV motion from one bin to the next will be considered so that the most efficient path down the aisle can be taken.

5.1.6.8.2 The left and right sides of the aisle will be treated as identical in terms of 'cost of PAV motion' and left/right picks will be fully mixed.

5.1.6.8.3 An estimated conveyor transport time will be used to determine the 'cost' of each inter-aisle tote movement, with the estimate being specific to the particular pair of aisles and the direction of movement.

5.1.6.8.4 Missing a shipment's critical path time (CPT) will incur a large penalty, thus resulting in selecting a plan that results in no missed CPT's, unless meeting all CPT's becomes impossible (e.g., due to overwhelming order volume). In the case where missing one or more CPT's is unavoidable, the plan that misses the fewest CPT's is generally the preferred plan.

5.2 Configurator Functionality 5.2.1 General Functionality 5.2.1.1 The configurator's main function is to route totes to spurs in the sequence specified by the scheduler plan. Additionally, the configurator maintains the incoming empty and restock tote buffers, interacts with the replenishment operators for receiving replenishment totes, and controls the outgoing tote buffer.

5.2.1.2 Each tote will have a barcode. The barcode must be unique among all totes used within the fulfillment center.

5.2.1.3 Tote tracking data will be maintained within the FCA database and will be used to keep track of each tote's current logical assignment (e.g., shipment ID), status, and other information as needed by the Scheduler and Configurator, with the barcode being the record identifier.

5.2.1.4 Totes may be tracked within the PLC memory through conveyor sections where there is little chance of totes getting out of sequence. However, the barcode will be scanned and the tote record retrieved at any critical decision/verification points (e.g., at the PAV).

5.2.1.5 Tote location information will be uploaded from the PLC to the Scheduler each time that a tracked tote passes a decision point. This historical data will be used by the Scheduler in estimating the time required to get any given tote from its current location to various destinations being considered for the tote.

5.2.2 Aisle Spurs 5.2.2.1 Each spur has an incoming conveyor and an outgoing conveyor.

5.2.2.2 The incoming conveyor delivers totes to a re-sorting area that sequences the totes into the correct order within left and right spurs.

5.2.2.3 The left spur is for handling the odd numbered totes in the sequence (e.g., 1, 3, 5 . . . ) and the right spur is for handling the even numbered totes in the sequence (e.g., 2, 4, 6 . . . )

5.2.2.4 As each tote on the main conveyor arrives at the entrance to an aisle spur, it will be evaluated to determine if it matches the next 'n' tote(s) currently required for that spur. If it matches and there is room for the tote within the spur, then it will be diverted into the spur. Otherwise, the tote will continue downstream on the main conveyor.

5.2.2.4.1 The totes in a given sortie, including empty totes, will be identified in the sortie by the exact barcode.

5.2.2.4.2 If a tote is forced to bypass its intended spur or is delayed in arriving beyond the when the sortie must be processed, the PLC will notify the scheduler immediately so that the plan can be rearranged as necessary.

5.3 Tote Shuttle General Functionality 5.3.1 The tote shuttle has two levels with two parallel conveyors on each level.

5.3.2 The tote shuttle will dock with the configurator spur.

5.3.3 The tote shuttle will immediately release all processed totes from its two outgoing conveyors onto the outgoing spur conveyors.

5.3.4 Simultaneously, the tote shuttle will receive fresh totes from the two incoming spur conveyors.

5.3.5 The tote shuttle will then move to couple up with the PAV. Once coupled, the tote shuttle will transfer fresh totes to the PAV and receive finished totes from the PAV.

5.3.6 The tote shuttle will receive up to 6 processed totes from each PAV outgoing conveyor, for a total of up to 12 totes.

5.3.7 Simultaneously, the tote shuttle will transfer all fresh totes onto the PAV incoming conveyors.

5.3.8 Note that the tote shuttle may be carrying less than a full load of fresh totes and may receive less than a full load of processed totes. The shuttle will always receive whatever processed totes the PAV has available. The shuttle will only dock and transfer fresh totes when there is room on the PAV receiving conveyors for the full quantity of fresh totes the shuttle is carrying. The totes on the left and right lift mechanisms provide a buffer for the operator to continue working during the transfer.

5.3.9 Once all totes are transferred, the tote shuttle will return to the configurator spur.

5.4 PAV General Functionality 5.4.1 The PAV has two parallel incoming conveyors. At the end of each conveyor is a tote lift mechanism that presents each incoming tote at an angle for the operator and also transfers each outgoing tote to the outgoing conveyor below. There is a tote barcode scanner at each tote lift mechanism. There is also a lighted touch-switch (zero force capacitive switch) next to each tote lift mechanism.

5.4.2 The PAV will index an incoming tote onto the tote lift mechanism.

5.4.3 The barcode will be scanned and the tote information looked up in the plan data. The tote information will include the type of tote (e.g., shipment, restock, unload), human-centric bin designation, bin X/Z coordinates, SKU, quantity, and any additional data required for the PAV operation.

5.4.3.1 Note that there are two tote lift mechanisms so while the operator is working on one tote, the other tote is typically being brought in and scanned. Thus, the data for the next tote is typically known before the operator completes work on the current tote.

5.4.4 If the next bin location requires PAV motion, the PAV will do the following:

5.4.4.1 The system will indicate the upcoming motion to the operator.

5.4.4.1.1 The general direction and distance of the motion will be indicated on the HMI.

5.4.4.1.2 The remaining distance will be indicated during the motion.

5.4.4.2 The operator will initiate the motion by grasping both hold-to-run handles. This is the operator's acknowledgement that they have their hands out of the bins, are in a stable stance, and otherwise prepared for the motion.

5.4.4.3 Both hold-to-run handles must remain grasped through the completion of the motion.

5.4.5 The PAV will indicate the next pick, stow, or unload operation to the operator in several ways, simultaneously.

5.4.5.1 The tote (left or right) will be identified by turning on an indicator light next to the tote.

5.4.5.2 The HMI will display the operation to be performed, giving full detail, including:

5.4.5.2.1 Indicator for left or right tote.
5.4.5.2.2 Operation to perform (e.g., Pick, Unload, Stow).
5.4.5.2.3 SKU identifier.
5.4.5.2.4 SKU description.
5.4.5.2.5 SKU image.
5.4.5.2.6 Quantity ("ALL" for Unload).
5.4.5.2.7 Bin designator (the bin address).
5.4.5.2.8 An image of the aisle face, as seen by the operator, with the target bin highlighted.

5.4.6 The operator will perform the requested operation.

5.4.6.1 Note that in the case of a pick or stow, the operator may use the HMI to indicate a quantity less than the requested quantity prior to indicating that the operation was completed. This is discussed further in the section on exception handling.

5.4.7 The operator will verify that they operated on the correct tote in either of two ways:

5.4.7.1 By touching a capacitive (zero force) switch next to that tote.

5.4.7.2 By touching the tote indicator on the HMI.

5.4.8 The operator will be stepped through all operations that are required for this tote.

5.4.8.1 Note that a single tote may require multiple operations at a single PAV location due to batching and other optimization logic in the scheduler.

5.4.9 After the completion of the last operation for this tote in this PAV location, the tote will be moved to the outgoing conveyor.

5.4.10 The other tote should already be in position, so as soon as the operator indicates that the final operation for the previous tote is completed, the PAV will initiate the next step in the sequence (PAV move or operator action).

5.5 Vehicle Special Functions 5.5.1 The operator may command the PAV to move to a parking position at ground level near the open end of the aisle. The operator must request this motion via the HMI and then hold the safety grips to enable the motion.

5.5.2 The operator may command the PAV to move to ground level at the current horizontal position within the aisle. The operator must request this motion via the HMI and then hold the safety grips to enable the motion.

5.5.3 The operator may command the PAV to return to the last operating position (i.e., the last place that the PAV moved automatically) within the aisle. The operator must request this motion via the HMI and then hold the safety grips to enable the motion.

5.5.4 The operator may command the tote shuttle to move to a parking position at ground level at the configurator end of the aisle. It is not necessary to hold the safety grips during shuttle motion.

5.5.5 The operator may command the tote shuttle to couple with the configurator conveyors, as it would during a tote exchange with the configurator. It is not necessary to hold the safety grips during shuttle motion.

5.5.6 The operator may command the tote shuttle to execute a tote transfer between the tote shuttle outgoing (bottom) conveyors and the configurator. It is not necessary to hold the safety grips during the transfer. The tote shuttle must be currently coupled with the configurator before this command will be allowed.

5.5.7 The operator may command the tote shuttle to couple with the PAV, at the current PAV position, as it would during a tote exchange with the PAV. It is not necessary to hold the safety grips during shuttle motion. The PAV must be positioned within normal operating limits within the aisle before this command will be allowed.

5.5.8 The operator may command the PAV and tote shuttle to execute a tote transfer between the two vehicles. It is not necessary to hold the safety grips during the transfer. The PAV and tote shuttle must be currently coupled before this command will be allowed. The vehicles will complete the transfer of both incoming and outgoing totes, within limits of available space on the respective receiving conveyors.

5.5.9 The operator may command the PAV to move to a specified bin location. The operator will enter the bin address into the HMI before requesting the move. The system will check that the tote shuttle is not in the way before this command will be allowed. The operator must request this motion via the HMI and then hold the safety grips to enable the motion.

5.6 PAV Manual Operation 5.6.1 The operator may use the HMI to manually control the PAV. To access the manual control features, the PAV must first be put into manual mode. This is done via the HMI.

5.6.2 Once in manual mode, the operator may use buttons on the HMI to jog forward and reverse as well as up and down. To initiate jog motion, the operator must first grasp and hold one of the hold-to-run safety grips and then must press and hold the desired jog button on the HMI. The motion will continue only as long as both the hold-to-run and the jog button are pressed and will stop as soon as either is released.

5.6.3 The PAV HMI will also allow manual control of all aspects of the tote conveyors and other mechanisms that are part of the PAV.

5.6.4 The PAV logic will limit jogging in the direction of the tote shuttle such that a safe minimum inter-vehicle distance is maintained.

5.7 Tote Shuttle Manual Operation 5.7.1 A pendant connected to the tote shuttle will be used when manual jogging of the tote shuttle is required.

5.7.2 The pendant will include, at a minimum, a dead man switch and two-axis jog controls.

5.8 PAV Support of QA Bin Verification 5.8.1 The WMS will be responsible for determining what bin verifications are necessary on any given day.

5.8.2 The WMS will download bin verification requests to the FCA in a manner similar to the download of shipment requests.

5.8.3 The bin verification request will include the bin designation and the SKU to be verified.

5.8.4 The bin verifications will only be handled by operators with this role assigned to their login credentials.

5.8.5 The scheduler will schedule bin verifications as a low priority task and will only schedule them for a PAV currently operated by a qualified operator.

5.8.6 The PAV will move to the target bin and the bin verification request data will be displayed to the operator. This will include the bin designator, the SKU, SKU image, and SKU description.

5.8.7 The operator will scan the bin label, scan an item of the indicated SKU, and enter the number of items of that SKU present in the bin.

5.8.7.1 If the quantity entered is different from the expected quantity, then the operator will be informed of the difference and given an opportunity to re-count the quantity.

5.8.8 The FCA will notify the WMS of the completion of the bin verification and notify it of any resulting bin data changes.

5.9 PAV/Tote Shuttle Safety 5.9.1 The PAV will include two sets of safety override controls for the PAV vertical motion, one within the cab and one reachable at ground level for use in lowering the PAV cab. These controls will override the safety circuit for the vertical axis and allow it to be jogged up or down.

5.9.2 Each PAV and each tote shuttle will have a safety scanner mounted both front and rear.

5.9.3 Each PAV and each tote shuttle will include emergency stop buttons on the front and rear, reachable from ground level.

5.9.4 The PAV will include two-hand hold-to-run grips within the cab. Both grips must be held to enable PAV servo motion. The grips will be located near the tote loading area and will be centered side-to-side so as to keep the operator clear of the shelving.

5.9.5 The PAV will include an emergency stop button and lanyard within the cab.

5.9.6 The operator will operate the PAV from a standing position. A safety harness attached to the PAV ceiling will protect the operator against falls.

5.9.7 The rear side of the PAV cab will be guarded by a railing/fence to keep the operator from falling out of the back. The fence will include a small gate used to enter/exit the PAV cab. The gate will have a lock and a safety switch.

5.10 Replenishment and Inbound Restock 5.10.1 Replenishment 5.10.1.1 Replenishment occurs when the WMS determines that a SKU from the reserve area is needed.

5.10.1.2 The WMS will issue a request directly to the replenishment operators. The request will identify the SKU and quantity.

5.10.1.3 The operator will retrieve an empty tote, either directly from the incoming empty tote buffer conveyor or from a stack of totes nearby.

5.10.1.4 The operator will use a customer-supplied application to associate the replenishment items with the tote.

5.10.1.5 The quantity of items loaded into the tote may be to supply multiple bins of the same SKU.

5.10.1.6 Multiple SKU's may also be loaded into the same tote.

5.10.1.7 The tote will be placed onto the FCA restock buffer conveyor at the manual intervention stop.

5.10.2 Inbound Restocking 5.10.2.1 Inbound restocking occurs when inbound stock arrives at the receiving dock and is loaded directly into totes which are then immediately released onto the conveyor system.

5.10.2.2 Inbound restock is based on predictions that are made far in advance and their release onto the conveyor is not predicated on the system having a current need for the parts.

5.10.2.3 The quantity of items loaded into a tote is based on the quantity received from the vendor and is not directly related to the quantity in the system.

5.10.2.4 A customer-supplied application will associate each SKU and SKU quantity to the tote.

5.10.2.5 The tote will be released onto a conveyor that merges with the empty tote return conveyor and will be delivered to the FCA floor.

5.10.3 Before a replenishment or inbound restock tote is released onto a conveyor, the WMS will update the tote record in the FCA via a call to the FCA API.

5.10.4 Once the record exists in the FCA database, it becomes available to the scheduler logic to incorporate into the tote sequencing plan.

5.11 Offloading Completed Totes 5.11.1 When a tote has been completed by the FCA, the tote will be transferred to an outgoing conveyor that leads to re-bin. Note that the Bowoo system may route totes through the OSR before sending them to re-bin.

5.11.2 At re-bin, all items must be removed from the tote before it is released onto the empty tote return conveyor.

5.11.3 The WMS will update the FCA tote record to indicate that this tote is now empty.

5.12 Offloading Fulfilled SKU Removal Requests 5.12.1 When a tote returns to the configurator with a fulfilled SKU removal request (tote filled with the removed Items), the tote will be transferred to the problem-solving area.

5.12.2 After the operator removes the items from the tote, the WMS will update the FCA tote record to indicate that this tote is now empty.

5.12.3 Note that a SKU removal request is only used when an existing SKU is no longer needed within the FCA (e.g., discontinued, or designated for the manual areas only).

5.13 Bin Data Management 5.13.1 The SKU's and bins in the storage shelves are managed directly by the FCA.

5.13.2 Each time that a pick or stow occurs, the FCA will notify the WMS.

5.13.3 Under certain conditions, the FCA will modify the SKU assignments of a bin.

5.13.3.1 When a restock occurs, the quantity in the tote may not fit into the target bin.

5.13.3.1.1 A check will be made to determine if there is another bin already assigned to the SKU and which has some room. If so, the tote will be routed to that bin. If not, another bin will be assigned automatically by the FCA and the tote will be routed there.

5.13.3.2 When SKU velocity information changes, the FCA may assign the SKU to another bin.

5.13.3.3 When a pick occurs that empties a bin, the FCA may decide to unassign the SKU from this bin.

5.13.3.4 The FCA may determine that a SKU needs to be moved to another bin. If this occurs, it will automatically issue an Unload request for the old bin, unassign the SKU from this bin after unloading, reassign the SKU to another bin, and automatically schedule a stow operation to place the removed items into this new bin.

5.13.3.5 Any changes to bin assignment will be communicated from the FCA to the WMS, thus keeping both systems up to date.

6.0 Batching and Combined Operations 6.1 A number of batching concepts will be used within the FCA to consolidate multiple shipments into a small number of totes. The FCA will keep the WMS informed of batches as follows.

6.1.1 The FCA will create FCA batch ID's for internal use. The WMS is not immediately notified of these because these 'virtual' batches are often transient (e.g., some batches are later absorbed into larger batches).

6.1.2 If an otherwise non-batched tote is about to exit the configurator, the FCA will create an FCA batch ID for this single shipment tote. This is done so that subsequent totes may be added to this batch as they exit the configurator. This is explained below in the batching method related to improving re-bin capacity utilization.

6.1.3 As the lead tote of each batch exits the configurator, the FCA will issue a Create WMS Batch event. The FCA supplies the FCA batch ID and the tote ID of the lead tote. WMS responds by creating a batch record within the WMS and associating the FCA batch ID and the lead tote ID to the WMS batch ID, and keeping the batch open for further tote additions.

6.1.4 As each tote exits the configurator, if it is part of an existing WMS batch, the FCA will issue a Modify WMS Batch event, giving the FCA batch ID and the tote ID. WMS adds the tote to the WMS batch, keeping the batch open for further additions.

6.1.5 After the last tote of a batch has exited the configurator, the FCA will issue a Complete WMS Batch event, supplying the FCA batch ID. The WMS will respond to the Complete WMS Batch event by 'closing' the batch or otherwise recognizing that the WMS now knows about all totes that make up the batch for OSR purposes.

6.1.6 As totes show up in the OSR, WMS will know if the batch is complete or if the system is still adding/sending totes for that batch. The OSR should only release the batch to re-bin once the batch is known to be complete.

6.1.7 The FCA will have a configurable time limit for how long it will allow a batch to remain open after the Create WMS Batch event (i.e., after the first tote of the batch has exited the configurator). That time limit will be taken into account when making batching decisions and will generally result in each batch completing at or before that time limit. This is to avoid a partial batch taking up space in the OSR for an extended period.

6.2 Opportunistic batching may occur when the PAV is scheduled to be at a certain bin location to complete an operation (pick or stow) on a tote and there are other single-SKU shipments that can be fulfilled from this same PAV position. If there is room in the tote, based on current contents and future operations that are already planned for the tote, then these single-SKU shipments may be added to this tote if the scheduler determines that this will be more efficient. Note that this will sometimes result in the operator picking items into a tote that still contains items to be stowed at a future PAV location.

6.3 Totes that are already 'completed' may be recirculated to receive additional picks in order to improve overall tote volume utilization, if this can be done without missing a CPT.

6.4 A 'virtual cross-docking' method will evaluate all restock (inbound or replenishment) totes to determine if items in the tote can be used to fulfill any active pick operations. If this is the case, and the scheduler determines that this will improve efficiency, then the operators will be directed to stow only the items that are not currently needed for these picks, thus leaving the required quantities in the totes. This avoids stowing and then immediately picking, thus saving both the stow and pick times for these items.

6.5 Large shipments with many SKU's will be broken up into smaller clusters of operations so that the operations may possibly be done in parallel. The scheduler may or may not schedule these operation clusters for separate totes. If they are scheduled for separate totes, this will result in the formation of a multiple tote batch.

6.6 Other conditions, not related to efficiency, will result in the creation of multiple tote batches.

6.6.1 If the operator indicates that the requested quantity for some pick cannot fit into the target tote, then the remaining quantity will be picked to another tote.

6.6.2 Disabling an aisle (and therefore disabling all bins within the aisle) may cause some picks to become 'undoable' which may result in multiple tote batches.

6.6.3 Certain problem-solving scenarios may result in formation of multiple tote batches.

6.7 As totes exit the main configurator onto the outgoing FCA conveyor, the system will attempt to optimize re-bin wall utilization by combining successive totes into batches.

6.7.1 System configuration settings will include the maximum number of shipments per re-bin wall, and the maximum number of items per re-bin wall.

6.7.2 As totes are exiting, the system will check to see if successive totes can be combined without exceeding these limits. If they can, then they will be combined into a single batch. This can be done even if the individual totes were already batches themselves.

7.0 FCA System HMI 7.1 An HMI application will exist on the production floor to provide high level system control and visibility. This application will provide the following functionality:

7.1.1 System overview, showing a graphical representation of the entire system, including:

7.1.1.1 Status (e.g., Empty, Completed shipment, Full, etc.) and approximate location of each tote, both on the conveyors and on the vehicles.

7.1.1.2 Status and approximate location of each vehicle.

7.1.2 Graphs and charts showing key performance indicators for the system over time (e.g., shipments downloaded, picks completed, stows completed, shipments completed, etc.).

7.1.3 Graphs and charts showing key performance indicators per aisle/vehicle (e.g., OEE, vehicle motion stats, operator efficiency stats, etc.).

7.2 Controls will be included that may be used to do the following:

7.2.1 Bypass/Purge all totes from an aisle (i.e., block new totes from entering while continuing to process all totes already within the aisle).

7.2.2 Disable an aisle (i.e., block further totes from being diverted to an aisle and mark all bins as 'unusable').

7.2.3 Enable an aisle.

8.0 General WMS/FCA Interface Requirements 8.1 The entire FCA/WMS interface is through a web-based API provided by the FCA.

8.1.1 The FCA provides information to the WMS via web hooks to which the WMS must subscribe.

8.1.2 The WMS provided information to the FCA by calling methods exposed via the FCA API.

8.1.3 The FCA does NOT call or otherwise directly access anything within the WMS.

8.2 Shipments 8.2.1 The WMS will push shipments to the FCA via web methods provided by the FCA web server. Each shipment is made up of some number of pick requests, where a pick request specifies the SKU and quantity of that SKU.

8.2.2 In the rare case of an FCA application restart, the FCA will notify the WMS of the restart event via a web hook. The WMS will respond to this event by sending all outstanding (unfulfilled) FCA shipments. The FCA will remove any duplicates (i.e., shipments it was already aware of).

8.2.3 For each shipment, the WMS will provide the list of required SKU's, the quantity required for each SKU, and the shipment's required fulfillment date/time. See API documentation for additional requirements.

8.2.4 The FCA notifies the WMS of all bin data changes, all pick operation quantities that are completed, and all pick operation quantities that are currently unfulfillable. If any portion of a requested pick operation is being reported as unfulfillable, then the WMS may decide to cancel it within the FCA (and possibly complete it elsewhere).

8.2.4.1 If the WMS decides that an unfulfillable pick operation should be cancelled, then it will notify the FCA of the cancellation, giving the pick operation (defines the SKU and the quantity) to be cancelled.

8.3 Replenishment and Inbound Restock 8.3.1 The WMS will push restock and replenishment tote data to the FCA via web methods provided by the FCA web server. Restock and replenishment are identical from the FCA's point of view. Each record is made up of a tote ID plus some number of stow requests, where a stow request specifies a SKU and quantity of that SKU.

8.4 SKU Data 8.4.1 The WMS will maintain knowledge of which SKU's are associated with the FCA.

8.4.2 Each time that an FCA-related SKU is added or modified within the WMS, the SKU data will be pushed to the FCA. Note that the SKU velocity and dimensions are critical parts of the SKU definition and so the FCA must be updated any time this information changes.

8.4.3 For each SKU, the WMS will provide the ID, description, image, dimensions, weight, and velocity. See API documentation for additional requirements.

8.4.4 If an existing SKU is to be removed from the FCA (e.g., if the SKU is discontinued), the WMS will notify the FCA with a SKU removal request, specifying the SKU to be removed.

8.4.5 The FCA independently manages the SKU-to-bin assignments using logic that is optimized for FCA performance.

8.5 Tote Data 8.5.1 The WMS will push tote data changes to the FCA any time that a tote is added or is modified by the WMS, including:

8.5.1.1 Unloading the tote at re-bin or pack-out.
8.5.1.2 Loading a tote at inbound.
8.5.1.3 Loading a tote at replenishment.
8.5.1.4 As a result of any activities at problem solving.
8.5.1.5 Upon 'request' from the FCA. The request would be made via a web hook for a tote data request 'event'.

8.5.2 When a tote is emptied, the WMS will update the FCA to indicate this.

8.5.3 When a tote is loaded with inbound restock or replenishment, the WMS will supply the list of SKU's and the quantity of each SKU. See API documentation for additional requirements.

8.5.4 Note that the WMS must update the FCA on ALL tote data changes, not just for those totes that are currently routed to the FCA. This is for many reasons, including the fact that an operator may grab a tote from anywhere in the FC and place it directly onto the FCA conveyors.

8.6 Bin Data 8.6.1 The WMS will only be required to push bin data updates if changes are made to FCA bin contents without using the FCA-provided tools. This might happen in a case where the customer has a need to manually change bin contents within an aisle without the use of the PAV.

9.0 FCA Interaction with WMS-Controlled Manual Areas 9.1 There will be no direct interaction between the FCA control system and the WMS-controlled manual areas (e.g., re-bin, inbound restock).

9.2 When a shipment requires fulfillment both by the FCA and by the manual system, the WMS will split the shipment into two shipments that are related to each other within the WMS by a batch number. The FCA will be unaware of this and will simply receive a shipment request that represents the FCA portion. This shipment will be processed normally within the FCA and simply released to the outgoing conveyor. The batched shipments will be recombined within the WMS-controlled areas.

9.3 When a tote reaches pack-out, the operator will remove all product from the tote. The WMS must mark the tote as empty and send this tote data update to the FCA.

9.4 Restock totes will be entered into the system via one or more WMS-controlled operator stations. When the tote is introduced, the WMS will associate the tote with the restock request data (SKU's and quantity per SKU) and will pass this information to the FCA.

10.0 FCA Warehouse Management (aka, Slotting)

10.1 The FCA will fully manage the assignment of SKU's to bins within the FCA warehouse.

10.2 The WMS is responsible for the following:

10.2.1 Notifying the FCA of each new SKU that it has associated with the FCA.

10.2.2 Notifying the FCA when SKU data is updated (e.g., when the velocity changes).

10.2.3 Notifying the FCA when a SKU is to be removed from the FCA (e.g., when the SKU is being discontinued).

10.3 When a new SKU is to be added to the FCA, the WMS would first notify the FCA with the new SKU definition. The WMS would then direct the inbound operators to load items of this SKU into a tote. The WMS will notify the FCA of this tote being routed to the FCA. The FCA will work the new SKU into the slotting plan. The FCA will direct the tote to the appropriate bin(s) and command the operator to stow the items.

10.4 When a SKU is to be removed from the FCA, the WMS will notify the FCA that the SKU is to be removed. The FCA will schedule one or more empty totes to receive all remaining items of this SKU, from however many bins it may currently live in. These totes will be sent to the problem-solving spur where the operator will be informed that the product is being removed from the FCA.

10.5 As PAV workload allows, the FCA will actively manage the SKU-to-bin assignments so as to position the highest velocity SKUs in the most efficient locations within the aisles. It will do this by scheduling picks and stows to move product from one location to another during times of low PAV/operator utilization.

11.0 Bin Data Handling Details 11.1 The system maintains bin data within the FCA database for use by the FCA.

11.2 The WMS separately maintains bin data for its own purposes, including triggering of restock orders to vendors, etc.

11.3 Each time that the FCA updates bin data internally, it will inform the WMS via web hooks to which the WMS has subscribed. This includes:

11.3.1 Modifying SKU to bin associations.

11.3.2 Updating bin-specific SKU quantities after each pick or stow.

12.0 Tote Data Handling Details 12.1 The system maintains tote tracking data within the FCA database for use by the FCA.

12.2 The WMS separately maintains tote tracking data for its own purposes, including tote routing on the Bowoo conveyor system.

12.3 Each time that the FCA updates tote data internally, it will inform the WMS via web hooks to which the WMS has subscribed. This includes:

12.3.1 Associating a shipment to a tote.

12.3.2 Updating SKU and SKU quantities after each pick or stow.

12.3.3 Setting special tote statuses (e.g., empty, problem tote).

12.4 Each time that the WMS updates tote data, it will inform the FCA via methods provided in the API.

12.4.1 When an empty tote is loaded onto any conveyor (Bowoo or FCA), the WMS will inform the FCA that the tote is empty and where it is routed to.

12.4.2 When any restock or replenishment tote is loaded onto any conveyor (Bowoo or FCA), the WMS will inform the FCA of all SKU's and SKU quantities in the tote and where it is routed to.

12.5 If a new tote is loaded onto the conveyor without being identified by the WMS, the FCA will send the tote to the problem-solving spur.

13.0 Replenishment Details 13.1 The customer will determine which SKU's are to be restocked through the replenishment process.

13.2 Replenishment reserves for the FCA will be located on the 4th floor. The customer will be responsible for maintaining this stock by moving pallets up the elevators.

13.3 The FCA will update the WMS with each change in bin quantity as picks and stows are completed.

13.4 The WMS will make decisions based on bin levels and generate replenishment requests directly to the replenishment operators via customer-supplied handheld devices.

13.5 The operators will maintain a supply of empty totes in the replenishment area by periodically pulling empty totes from the incoming empty tote buffer. They will use these totes to load with replenishment items.

13.6 A customer-supplied handheld device and related application code will associate replenishment items with the tote. SKU's can be mixed in a tote if desired.

13.7 The WMS will notify the FCA of the contents of the replenishment tote.

13.8 Once a replenishment tote is fully loaded, the tote will be placed onto the manual intervention stop on the restock buffer conveyor.

13.9 An FCA-controlled scanner on the restock buffer conveyor will read the tote ID and handle the tote appropriately.

14.0 Inbound Restock Details 14.1 The customer will determine which SKU's are to be restocked through the inbound process and how much should go to the FCA vs manual areas.

14.2 The operators will maintain a supply of empty totes in the inbound area. They will use these totes to load with inbound items.

14.3 A customer-supplied station and related application code will associate inbound items with the tote. SKU's can be mixed in a tote if desired.

14.4 Once an inbound restock tote is fully loaded, the operator will release the tote and the Bowoo conveyor will deliver the tote to the FCA.

14.5 The WMS will notify the FCA of the inbound restock tote, providing the tote ID, SKUs, SKU quantities, current location of the tote, and a timestamp for when it was released.

14.6 An FCA-controlled scanner on the FCA input conveyor will read the tote ID when it arrives and the FCA will handle the tote appropriately.

15.0 Exception Handling 15.1 Bin location has too few Items (including zero) remaining to complete a Pick operation.

15.1.1 Operator will enter the actual number of items picked.

15.1.2 Tote will be updated based on quantity picked.

15.1.3 Bin quantity will be set to zero.

15.1.4 If the SKU exists in another bin, the tote will be routed to that bin to pick the remaining quantity.

15.1.5 If the SKU does not exist in another bin, the FCA will mark the remaining pick operation as 'undoable' internally. The completed portion of the shipment may be sent downstairs. It is up to the WMS to decide if the remaining pick operation should be cancelled in the FCA.

15.2 Tote has too few items (including zero) to complete a stow operation.

15.2.1 Operator will enter the actual number of items stowed.

15.2.2 Bin will be updated to add the indicated quantity of the SKU.

15.2.3 Tote will be updated to indicate zero quantity of the given SKU.

15.2.4 Tote processing continues normally.

15.3 Requested number of pick items will not physically fit into the tote.

15.3.1 Operator will enter the actual number of items picked to the tote.

15.3.2 Tote will be updated based on quantity picked.

15.3.3 Bin quantity will be adjusted based on quantity picked.

15.3.4 The tote will be marked as full.

15.3.5 The remainder of the pick quantity will be assigned to another tote, with this tote and the original tote forming a multi-tote batch.

15.4 Bin location has too little room to complete a stow operation.

15.4.1 Operator will enter the actual number of items stowed.

15.4.2 Tote will be updated based on quantity stowed.

15.4.3 Bin quantity will be adjusted based on quantity stowed.

15.4.4 If the SKU exists in another bin and that bin has room, the tote will be routed to that bin to stow the remaining quantity.

15.4.5 If the SKU does not exist in another bin or no other bin for that SKU has room, and there is room in a dynamic bin, then the FCA will dynamically allocate another bin for that SKU and the tote will be routed there.

15.4.6 If the FCA can find no bin to stow the remaining items in, then the tote will be routed to the problem-solving area on the 4th floor.

15.5 The operator is completing a 'final stow' operation (i.e., the HMI indicates that there should be zero remaining in the tote after the stow operation) but the quantity in the tote exceeds the requested quantity.

15.5.1 Operator should attempt to fit the entire quantity into the target bin, and will then enter the quantity actually stowed.

15.5.1.1 If the entire quantity was stowed, no further action is required from the operator since the system will assume that the tote quantity is zero after the stow operation is completed.

15.5.1.2 If some quantity remains in the tote, the operator will indicate this exception and will enter the quantity remaining in the tote.

15.5.2 Bin quantity will be updated to indicate the quantity actually stowed.

15.5.3 Tote quantity will be updated to indicate the quantity remaining (if any).

15.5.4 If the tote quantity is non-zero, then the tote will be handled the same as when there is insufficient room in a bin.

15.6 Operator drops an Item during a pick, stow, or unload.

15.6.1 Operator will use the HMI to lower the PAV to ground level.

15.6.2 Operator will get out and retrieve the dropped item(s).

15.6.3 Operator will use the HMI to return the PAV to the bin position.

15.6.4 Operator will complete the operation (pick, stow, or unload) normally.

15.7 Operator identifies a defective/damaged Item during a pick or unload.

15.7.1 Operator will press a button on the HMI to bring up a Reject Item screen.

15.7.2 The screen will be pre-populated with the Bin and SKU related to the current operation. The quantity will default to 1.

15.7.3 The operator may edit the Bin, SKU and quantity. Note that they might edit the Bin if they notice a damaged item in a bin other than the one they are currently picking from. They might edit the SKU if the bin is multi-SKU or if they are also editing the bin.

15.7.4 Once the data correctly indicates the Bin, SKU, and quantity, the operator presses OK.

15.7.5 The bin quantity for the SKU will be reduced by the indicated quantity and this item(s) will be associated with the reject item container within the PAV.

15.7.6 The operator places the defective item in the defective item container within the PAV cab.

15.8 Operator identifies a reject/damaged Item during restock.

15.8.1 Operator will press a button on the HMI to bring up a Reject Item screen.

15.8.2 The screen will be pre-populated with the Bin and SKU related to the current operation. The quantity will default to 1.

15.8.3 The operator may edit the Bin, SKU and quantity. Note that they might edit the Bin if they notice a damaged item in a bin other than the one they are currently stowing to. They might edit the SKU if the bin is multi-SKU or if they are also editing the bin.

15.8.4 Once the data correctly indicates the Bin, SKU, and quantity, the operator presses OK.

15.8.5 The bin quantity for the SKU will be reduced by the indicated quantity and this item(s) will be associated with the defective item container within the PAV.

15.8.6 The operator places the defective item in the defective item container within the PAV cab.

15.9 Defective item container needs to be emptied 15.9.1 Operator will use a button on the HMI to request an empty tote for use as a defective item tote.

15.9.2 The HMI will indicate that a defective item tote has been requested. The notification will remain on the screen until a defective item tote has been received.

15.9.3 The scheduler will add a defective item 'operation' to the very next plan and will associate an empty tote with this operation.

15.9.4 When the designated empty tote arrives at the tote lift, the operation will be identified as 'place defective items in tote'.

15.9.5 The operator will transfer any defective items from the container within the PAV to this tote and indicate that they have completed this operation.

15.9.6 The system will disassociate the item(s) from the container and associate them with the tote.

15.9.7 The tote will be routed to the problem-solving area.

15.10 Tote cannot be identified at head of sorter 15.10.1 This can be either due to a no-read or due to no valid tote record being found.

15.10.2 Tote will be routed to the problem-solving area on the 4th floor.

15.11 Tote cannot be read at PAV 15.11.1 The operator will be notified of the no-read.

15.11.2 The operator will scan or enter the tote barcode.

15.11.3 The tote will be operated on normally.

16.0 Problem-Solving Spur 16.1 The problem-solving spur itself includes a diverter from the main sorter that feeds a simple conveyor that comes to a 'dead end' in the problem-solving area on the 4th floor. There is no fixed mounted barcode scanner or HMI at the end of this conveyor.

16.2 The customer is responsible for supplying a handheld device and problem-solving application software that can handle all of the following.

16.2.1 Defective product tote.

16.2.1.1 Tote will contain nothing but defective product(s) that were collected by a PAV operator.

16.2.1.2 Product will be removed by the problem solver.

16.2.1.3 Tote status will be set to "empty" and the FCA will be notified of the tote data change.

16.2.1.4 Tote may now be used for any purpose or simply placed onto the manual intervention stop on the empty tote buffer conveyor.

16.2.2 Tote Rejected by PAV Operator 16.2.2.1 The PAV operator will have the ability to send any tote to the problem-solving spur. The system will notify the WMS of the reason for the tote being rejected.

16.2.2.2 When the tote arrives at the problem-solving spur, the problem solver will address the issue. Any changes to tote status or tote content must be sent to the FCA.

16.2.3 Unreadable tote barcode.

16.2.3.1 Totes that cannot be read at the head of the sorter will be routed to the problem-solving spur. Note that since the FCA could not read the barcode, there is no way for the FCA to set a special status for the tote. So, the tote will simply show up with no other 'problem' specified. The operator will need to be trained to recognize this as likely being due to a bad barcode.

16.2.3.2 The operator must clean or replace the unreadable barcode on the tote and then release the tote back into the system via the manual intervention stop on the restock buffer conveyor.

16.2.4 Unknown tote (i.e., no tote data record).

16.2.4.1 Operator must resolve this by ensuring that the WMS has data for the tote and that the WMS has notified the FCA of the tote data.

16.2.5 Removed SKU.

16.2.5.1 If the WMS has decided that a SKU is to be removed from the FCA (e.g., because the SKU has been discontinued), it will issue a removal request to the FCA. All removed items of the SKU will be routed to the problem-solving spur in one or more totes containing only this SKU.

16.2.5.2 The operator must remove the items from the tote and set the tote status to "empty."

16.2.6 Items that could not be stowed.

16.2.6.1 In the rare case that some portion of the content of a restock or replenishment tote cannot be stowed in the system, due to not enough bin space remaining anywhere in the FCA, the un-stowed portion will be routed to the problem-solving spur once those are the only items remaining in the tote.

16.2.6.2 The operator can either remove the items and mark the tote as empty, or leave the items in the tote and wait for another opportunity to release the tote back into the system via the manual intervention stop on the restock buffer conveyor.

17.0 Aisle Settings for Bypass/Disable/Enable 17.1 There will be occasions when an aisle must be taken out of service for various reasons, both planned and unplanned.

17.2 Setting an aisle's status to "Bypassed"

17.2.1 An aisle's status may be set to Bypassed from the main system HMI or the PAV HMI within that aisle by an operator with sufficient rights. The system HMI and affected PAV HMI will indicate that the aisle is bypassed.

17.2.2 When an aisle is bypassed, no additional totes will be diverted to this aisle. The FCA and scheduler applications will stop planning additional totes/sorties for the aisle.

17.2.3 All totes already within the aisle may be processed normally according to the plans already associated with them.

17.2.4 Note that any totes outside of the bypassed aisle that contain restock or replenishment items for SKU's that only exist in bins within the bypassed aisle will continue to circulate, waiting for the aisle to be re-enabled.

17.2.5 Any pick requests that may have been previously planned for this aisle, but are not already committed to totes within the aisle, will be re-considered by all other enabled aisles.

17.2.6 See section 17.4 for guidance on when bypassing and aisle may be appropriate.

17.3 Disabling an Aisle 17.3.1 An aisle's status may be set to Disabled from the main system HMI or the PAV HMI within that aisle by an operator with sufficient rights. The system HMI and affected PAV HMI will indicate that the aisle is disabled.

17.3.2 When an aisle is disabled, no additional totes will be diverted to this aisle. The FCA and scheduler applications will stop planning additional totes/sorties for the aisle.

17.3.3 Disabling an aisle causes the FCA to immediately mark all bins within the aisle as disabled. This causes the system to ignore this product in terms of SKU quantities available for use within the FCA. It also causes the system to ignore these SKU-to-bin assignments. Essentially, as far as the system is concerned, the aisle and the bins within it do not exist.

17.3.3.1 The FCA will immediately notify the WMS of the bin status changes. The WMS may decide that certain pick requests can no longer be serviced within the FCA and will tell the FCA to cancel these pick requests.

17.3.4 The FCA will delete all plans associated with totes that are currently within the aisle.

17.3.5 The FCA may internally set certain pick operations as 'undoable' based on lack of available items (due to bins being disabled). This may result in changes to tote statuses and also may result in changes in tote batching.

17.3.6 If a shipment relies on a pick request that has been set as undoable internally by the FCA, the FCA may do the following:

17.3.6.1 Create a batch (if it didn't already exist) and send the completed portion downstairs.

17.3.6.2 Wait on the undoable operation(s) to either become doable (e.g., aisle re-enabled or additional stock received) or to be cancelled by the WMS. If the WMS cancels the undoable operation(s) then the WMS will be notified that the batch is now complete (i.e., the totes already released are the last totes of the batch).

17.3.7 Disabling the aisle does not directly disable the aisle spur conveyors. Totes that are already in the spur will continue to be processed if possible.

17.3.8 Disabling an aisle does not directly disable the vehicles in that aisle. All operator controls within the PAV are still fully functional. However, since all bins have been disabled, no actual picking or stowing may be done.

17.4 Enabling an Aisle 17.4.1 A previously disabled aisle may be enabled from the main system HMI or from the PAV HMI within that aisle, by an operator with sufficient system rights.

17.4.2 Once an aisle is enabled, or a pending purge has been cancelled, normal scheduling will immediately resume for the aisle.

17.4.3 While the aisle was not enabled, the problem solver will have been updating bin data appropriately if any manual bin content changes occurred. So, the system will pick back up with full knowledge of the current state of the bins.

17.4.4 If the aisle had been bypassed, then the system will assume that its knowledge of tote statuses and locations is still valid.

17.4.5 If the aisle had been disabled, then the plan data for any totes within the aisle will have been deleted. Any totes discovered within the aisle will pass through with no operations being performed. Operation will only resume after receiving 'fresh' totes that are diverted to the aisle from the sorter.

18.0 Dealing with Aisle Outages 18.1 Purging an Aisle 18.1.1 If an aisle is operational, but needs to be taken out of service, an operator with sufficient system rights may choose to first purge all totes out of the aisle.

18.1.2 They may do this by first setting the aisle status to Bypassed, and then continuing to process all remaining totes in the aisle until all totes are completed and released back to the configurator.

18.2 Momentary Outage 18.2.1 An example of a momentary outage might be at change of shift, or if the operator needs to retrieve a dropped item.

18.2.1.1 No special steps need to be taken.

18.2.1.2 The system will continue to plan and operate in the same way as if an operator simply took a really long time to complete a pick or stow operation.

18.3 Short-Term Outage 18.3.1 An example of a short-term outage might be when some number of items were dropped accidentally and it will take some significant amount of time to clean up (e.g., broken bottle of liquid), or some minor vehicle maintenance must be performed.

18.3.2 The operator would set the aisle to Bypassed.

18.3.3 If the outage occurs close to a critical pull time, and product within the bypassed aisle is required to fulfill them, then some shipments may miss their ship time.

18.3.3.1 In order to give all totes their best opportunity of completing prior to CPT, the operator may choose to purge all totes out of the aisle by continuing to process all existing totes after putting the aisle into bypass.

18.3.4 Once the issue is resolved, the aisle may simply be enabled.

18.4 Long-Term Outage 18.4.1 An example of a long-term outage might be when some major part of the aisle has failed, such as the power rail or some portion of the conveyor spur. Another example would be a major vehicle failure with no spare vehicle available to swap in its place.

18.4.1.1 Note that if a long-term outage is a planned outage (not as a result of an immediate failure) then the suggested approach would be to first put the aisle into Bypass and purge all totes out of the aisle by completing all operations on these existing totes, and then switching to Disabled.

18.4.2 If totes are 'stuck' in the aisle, the operator should remove them. The totes may be transferred to the outgoing configurator spur conveyors or they may be removed and reintroduced at the manual intervention stop on the restock buffer conveyor. See section 5.5.1 for vehicle manual functions that can aid in this.

18.4.3 If the customer determines that the outage will be long enough to warrant it, then they may choose to relocate material from the disabled aisle to other aisles within the FCA or to other (manual) areas in the FC.

18.4.3.1 If product is removed from a bin, the problem solver must use their customer-supplied tools to notify the FCA of the SKU, SKU quantity, and bin for each group of items removed.

18.4.3.2 To relocate to another aisle in the FCA, the problem solver must use their customer-supplied tools to associate the product with a tote and introduce the tote onto the manual intervention stop on the restock buffer conveyor. This is the same as introducing any other restock or replenishment.

19.0 PAV Operator Logins, Roles, and Permissions 19.1 The customer will not be managing operator logins on their network (i.e., no Active Directory entries), so operator logins will be managed within the FCA database.

19.2 The FCA will support multiple operator roles that can be assigned to individual operator logins, with each role having a defined set of permissions in the system.

19.3 Initially, a set of 'generic' operator logins (one login per role) will be defined. The operators will share these logins. The customer may add personalized operator logins to the system if they choose to do so.

19.4 Logins will be managed via a simple interface provided on the system HMI.

19.5 The following operator roles will be supported.

| Role | PAV Operation | QA Bin Verification | Full Manual Control (e.g., Jogging Servos) | Disabling/ Enabling Lanes | Manage Logins |
|---|---|---|---|---|---|
| Operator | X | | | | |
| QA Operator | X | X | | | |
| Maintenance | X | | X | X | |
| Supervisor | X | X | X | X | X |

20.0 FCA Database and Scheduler Implementation Details 20.1 These systems will be hosted on two physical servers.

20.2 Each server will host one instance each of the Scheduler, the API web server, and the FCA database.

20.3 One server will host the 'live' Scheduler instance along with the 'backup' instances of the API web server and the FCA database.

20.4 The other server will host the 'live' instances of the API web server and the FCA database along with the 'backup' instance of the Scheduler.

20.5 If the live instance of one of the applications fails, the backup instance on the other server will take over.

20.6 The Scheduler and the API applications do not require persistent data and therefore can fail-over without the need for data replication.

20.7 The FCA database instances will be mirrored to support fail-over.

20.8 There are certain failure modes that will result in the loss of some number of 'events' (e.g., tote data change, etc.). Thus, when a fail-over occurs, totes that are at certain critical locations (e.g., at the operator location on a PAV) may be routed to the problem-solving area for verification/correction of the tote data.

20.9 The system will notify the WMS of any fail-over/ restart event. The WMS will respond to this by re-sending the most recently sent shipments. The system will use the unique shipment ID's to filter out any redundant records.

21.0 Configurable System Settings 21.1 The system will have a number of configurable system settings that can be used to modify the overall system behavior. The following is a partial list, along with what are expected to be the initial values. It is fully expected that these values will be modified as the real system's performance is evaluated.

21.1.1 Number of re-bin wall slots (used as the maximum number of shipments per batch)—60

21.1.2 Maximum number of items (units) per batch—300

21.1.3 Pick operation cluster size (number of pick operations in a 'cluster' when breaking large shipments into smaller units of work)—3 SKU's 21.1.4 Batch completion time limit (maximum time from when the first tote of a batch exits the configurator to when the last tote should exit)—10 minutes 21.1.5 Maximum number of SKU's that may be mixed in a bin—5

21.1.6 Maximum fill percent by volume when planning SKU-to-bin assignments—80%

21.1.7 Maximum fill percent by volume when planning tote usage—80%

Some embodiments of the invention use one or more features shown and described for the figures herein. Some embodiments of the invention use one or more features shown and described in the patents and patent applications incorporated herein by reference combined with one or more features shown and described for the figures herein.

In some embodiments, the present invention provides a method for order fulfillment, the method including: storing items in bins located along one or more sides of an aisle; moving a human operator picker and totes in a guided vehicle moving along the aisle; sequentially presenting to the human operator picker identifications of items to be picked from the bins and stowed in the totes; and collecting the totes for shipment to customers. In some such embodiments, the items are identified by stock-keeping unit (SKU) identifiers.

In some embodiments, the present invention provides an apparatus that includes: an automatically guided vehicle (AGV) that carries a human picker; a holder attached to the AGV, wherein the holder holds a plurality of shipping containers, wherein the AGV moves to a successive plurality of inventory stock bins so the human picker successively retrieves each of a plurality of stock items from the stock bins and places the respective items in preselected ones of the plurality of shipping containers based on a customer shipment order.

In some embodiments, the present invention provides an apparatus for order fulfillment, the apparatus including: means for storing items, wherein the means for storing are located along one or more sides of an aisle; means for moving a human picker and totes along the aisle; means for sequentially presenting to the human picker identifications of items to be picked from the bins and stowed in the totes; and means for collecting the totes for shipment to customers.

In some embodiments, the present invention provides a method for order fulfillment, the method including storing items in bins located along one or more sides of an aisle; moving a picker and a first plurality of totes in a guided vehicle moving along the aisle; sequentially presenting to the picker identifications of items to be picked from the bins and stowed in the first plurality of totes to form processed totes; and collecting the processed totes for shipment to customers.

In some embodiments of the method, the items are identified by stock-keeping unit (SKU) identifiers. In some embodiments, the guided vehicle includes a second plurality of restock totes that contain restock items, the method further including presenting to the picker identifications of the restock items to be placed into at least some of the bins from the second plurality of restock totes.

In some embodiments, the method further includes configuring the first plurality of totes to be processed in the aisle; and shuttling the configured first plurality of totes to the guided vehicle. In some embodiments, the method further includes configuring the first plurality of totes to be processed in the aisle, wherein the configuring includes determining a place and time to couple the first plurality of totes with the guided vehicle; shuttling the configured first plurality of totes to the guided vehicle; and coupling the first plurality of totes to the guided vehicle. In some embodiments, the collecting of the processed totes includes: uncoupling the processed totes from the guided vehicle; and shuttling the uncoupled processed totes away from the guided vehicle.

In some embodiments of the method, the picker is a human operator picker, and wherein the guided vehicle includes a cab for holding the human operator picker, the method further including positioning the cab so that the human operator picker has access to the items to be picked from the bins and stowed in the first plurality of totes.

In some embodiments of the method, the picker is a human operator picker, the method further including identifying one or more defective items in the bins; providing the human operator picker with a defective-item tote; stowing the one or more defective items in the defective-item tote; and diverting the defective-item tote away from the first plurality of totes to a problem-solving spur.

In some embodiments the method further includes configuring the first plurality of totes to be processed in the aisle; and shuttling the configured first plurality of totes to the guided vehicle, wherein the shuttling includes moving the first plurality of totes to the aisle on an input conveyor, wherein the collecting of the processed totes includes: uncoupling the processed totes from the guided vehicle; and shuttling the uncoupled processed totes away from the guided vehicle and to an output conveyor that takes the uncoupled processed totes away from the aisle.

In some embodiments, the method further includes vertically moving at least a first one of the first plurality of totes on the guided vehicle. In some embodiments, the method further includes horizontally moving at least a first one of the first plurality of totes on the guided vehicle.

In some embodiments, the present invention provides a system that includes an automatically guided vehicle (AGV) that carries a picker; and a holder attached to the AGV, wherein the holder holds a first plurality of totes, wherein the AGV moves to a successive plurality of inventory stock bins in an aisle so the picker successively retrieves each of a plurality of stock items from the stock bins and places the respective items in preselected ones of the first plurality of totes based on a customer shipment order to form a plurality of processed totes.

In some embodiments, the system further includes a configurator that configures the first plurality of totes to be processed based on the customer shipment order; and an input shuttle configured to move the first plurality of totes from the configurator to the holder of the AGV. In some embodiments, the picker is a human picker, wherein the AGV includes a cab for holding the human picker, and wherein the cab is configured to be positioned such that the human picker has access to the plurality of stock items. In some embodiments, the holder further holds a second plurality of restock totes that contain restock items to be placed into preselected ones of the stock bins.

In some embodiments of the system, the holder is configured to place each one of the first plurality of totes in a plurality of vertical positions on the holder. In some embodiments, the holder is configured to place each one of the first plurality of totes in a plurality of horizontal positions on the holder.

In some embodiments of the system, the picker is a human picker, wherein the holder includes a tote-lift mechanism configured to present an incoming tote at an angle for the human picker.

In some embodiments, the system further includes an output shuttle configured to move the plurality of processed totes away from the AGV. In some embodiments, the system further includes a configurator that configures the first plurality of totes to be processed based on the customer shipment order, wherein the configurator includes an input conveyor and an output conveyor; an input shuttle configured to move the first plurality of totes from the input conveyor of the configurator to the holder of the AGV; and an output shuttle configured to move the plurality of processed totes away from the AGV and to the output conveyor of the configurator.

In some embodiments of the system, the picker is a human operator picker, wherein the holder further holds at least a first defective-item tote, wherein defective items identified by the human picker are stowed in the at least first defective-item tote, the system further including an output conveyor configured to move totes away from the aisle; an output shuttle configured to move the plurality of processed totes and the at least first defective-item tote away from the AGV and to the output conveyor, wherein the output conveyor includes a diverter configured to divert the at least first defective-item tote away from the plurality of processed totes and toward a problem-solving spur.

In some embodiments, the system further includes a scheduler configured to plan when and how all pick and stow operations are to be performed; and a configurator that controls tote movements based at least in part on plans provided by the scheduler. In some embodiments, the system further includes a scheduler configured to plan when and how all pick and stow operations are to be performed; a configurator that controls movements of the first plurality of totes to be processed based at least in part on plans provided by the scheduler, wherein the configurator includes an input conveyor and an output conveyor; an input shuttle configured to move the first plurality of totes from the input conveyor of the configurator to the holder of the AGV; and an output shuttle configured to move the plurality of processed totes away from the AGV and to the output conveyor of the configurator.

In some embodiments, the present invention provides an apparatus for order fulfillment, the apparatus including means for storing items, wherein the means for storing are located along one or more sides of an aisle; means for moving a picker and totes along the aisle; means for sequentially presenting to the picker identifications of items to be picked from the bins and stowed in the totes; and means for collecting the totes for shipment to customers.

In some embodiments, the apparatus further includes means for planning when and how all pick and stow operations are to be performed; and means for controlling movement of the totes based at least in part on plans generated by the means for planning. In some embodiments, the means for moving the picker and totes includes means for moving placing the totes in a plurality of vertical positions and a plurality of horizontal positions.

In some embodiments, the present invention provides a method that includes moving a first plurality of totes to a guided vehicle, and coupling the first plurality of totes to the guided vehicle; automatically moving the guided vehicle along a first aisle, wherein the first aisle includes a plurality of bins located on a pick wall adjacent to the first aisle; picking items from selected ones of the plurality of bins and stowing the picked items in selected ones of the first plurality of totes; de-coupling the first plurality of totes from the guided vehicle; moving the first plurality of totes away from the guided vehicle; moving a second plurality of totes to the guided vehicle, and coupling the second plurality of totes to the guided vehicle; picking items from selected ones of the plurality of bins and stowing the picked items in selected ones of the second plurality of totes; de-coupling the second plurality of totes from the guided vehicle; and moving the second plurality of totes away from the guided vehicle.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for order fulfillment, the method comprising:
   storing items in bins located along one or more sides of an aisle;
   moving a picker and a first plurality of totes using a guided vehicle moving along the aisle;
   selectively repositioning at least one of the first plurality of totes from a first vertical position to a different second vertical position relative to others of the first plurality of totes;
   sequentially presenting to the picker identifications of items to be picked from the bins and stowed in the first plurality of totes to form processed totes; and
   collecting the processed totes for shipment to customers.

2. The method of claim 1, wherein the items are identified by stock-keeping unit (SKU) identifiers.

3. The method of claim 1, wherein the guided vehicle includes a second plurality of restock totes that contain restock items, the method further comprising presenting to the picker identifications of the restock items to be placed into at least some of the bins from the second plurality of restock totes.

4. The method of claim 1, further comprising:
   configuring the first plurality of totes to be processed in the aisle; and
   shuttling the configured first plurality of totes to the guided vehicle.

5. The method of claim 1, further comprising:
   configuring the first plurality of totes to be processed in the aisle, wherein the configuring includes determining a place and time to couple the first plurality of totes with the guided vehicle;
   shuttling the configured first plurality of totes to the guided vehicle; and
   coupling the first plurality of totes to the guided vehicle.

6. The method of claim 1, wherein the collecting of the processed totes includes:
   uncoupling the processed totes from the guided vehicle; and
   shuttling the uncoupled processed totes away from the guided vehicle.

7. The method of claim 1, wherein the picker is a human operator picker, and wherein the guided vehicle includes a cab for holding the human operator picker, the method further comprising:
   positioning the cab so that the human operator picker has access to the items to be picked from the bins and stowed in the first plurality of totes.

8. The method of claim 1, wherein the picker is a human operator picker, the method further comprising:
   identifying one or more defective items in the bins;
   providing the human operator picker with a defective-item tote;
   stowing the one or more defective items in the defective-item tote; and
   diverting the defective-item tote away from the first plurality of totes to a problem-solving spur.

9. The method of claim 1, further comprising:
configuring the first plurality of totes to be processed in the aisle; and
shuttling the configured first plurality of totes to the guided vehicle, wherein the shuttling includes moving the first plurality of totes to the aisle on an input conveyor, wherein the collecting of the processed totes includes:
uncoupling the processed totes from the guided vehicle; and
shuttling the uncoupled processed totes away from the guided vehicle and to an output conveyor that takes the uncoupled processed totes away from the aisle.

10. The method of claim 1, wherein the selectively repositioning further includes:
vertically moving the first one of the first plurality of totes while the first plurality of totes is coupled to the guided vehicle.

11. The method of claim 1, further comprising:
horizontally moving at least a first one of the first plurality of totes on the guided vehicle.

12. A system comprising:
an automatically guided vehicle (AGV) that carries a picker; and
a holder attached to the AGV, wherein the holder holds a first plurality of totes, wherein the AGV moves to a successive plurality of inventory stock bins in an aisle so the picker successively retrieves each of a plurality of stock items from the stock bins and places the respective items in preselected ones of the first plurality of totes based on a customer shipment order to form a plurality of processed totes, wherein the holder is configured to selectively reposition at least one of the first plurality of totes from a first vertical position to a different second vertical position relative to others of the first plurality of totes.

13. The system of claim 12, further comprising:
a configurator that configures the first plurality of totes to be processed based on the customer shipment order; and
an input shuttle configured to move the first plurality of totes from the configurator to the holder of the AGV.

14. The system of claim 12, wherein the picker is a human picker, wherein the AGV includes a cab for holding the human picker, and wherein the cab is configured to be positioned such that the human picker has access to the plurality of stock items.

15. The system of claim 12, wherein the holder further holds a second plurality of restock totes that contain restock items to be placed into preselected ones of the stock bins.

16. The system of claim 12, wherein the holder is configured to place each one of the first plurality of totes in any one of a plurality of vertical positions and horizontal positions relative to others of the first plurality of totes on the holder.

17. The system of claim 12, wherein the holder is configured to place each one of the first plurality of totes in a plurality of horizontal positions on the holder.

18. The system of claim 12, wherein the picker is a human picker, and wherein the holder includes a tote-lift mechanism configured to present an incoming tote at an angle for the human picker.

19. The system of claim 12, further comprising:
an output shuttle configured to move the plurality of processed totes away from the AGV.

20. The system of claim 12, further comprising:
a configurator that configures the first plurality of totes to be processed based on the customer shipment order, wherein the configurator includes an input conveyor and an output conveyor;
an input shuttle configured to move the first plurality of totes from the input conveyor of the configurator to the holder of the AGV; and
an output shuttle configured to move the plurality of processed totes away from the AGV and to the output conveyor of the configurator.

21. The system of claim 12, wherein the picker is a human operator picker, wherein the holder further holds at least a first defective-item tote, and wherein defective items identified by the human picker are stowed in the at least first defective-item tote, the system further comprising:
an output conveyor configured to move totes away from the aisle; and
an output shuttle configured to move the plurality of processed totes and the at least first defective-item tote away from the AGV and to the output conveyor, wherein the output conveyor includes a diverter configured to divert the at least first defective-item tote away from the plurality of processed totes and toward a problem-solving spur.

22. The system of claim 12, further comprising:
a scheduler configured to plan when and how all pick and stow operations are to be performed; and
a configurator that controls tote movements based at least in part on plans provided by the scheduler.

23. The system of claim 12, further comprising:
a scheduler configured to plan when and how all pick and stow operations are to be performed;
a configurator that controls movements of the first plurality of totes to be processed based at least in part on plans provided by the scheduler, wherein the configurator includes an input conveyor and an output conveyor;
an input shuttle configured to move the first plurality of totes from the input conveyor of the configurator to the holder of the AGV; and
an output shuttle configured to move the plurality of processed totes away from the AGV and to the output conveyor of the configurator.

24. The system of claim 12, wherein the holder further includes:
an elevator; and
a plurality of shelves vertically separated from one another and coupled to the one or more elevators, wherein each one of the first plurality of totes is on a respective one of the plurality of shelves, and wherein each one of the plurality of shelves is configured to be selectively moved horizontally and vertically by the elevator.

25. The system of claim 12, wherein the holder further includes:
a plurality of elevators;
a first plurality of shelves vertically separated from one another and coupled to a first elevator of the plurality of elevators;
a second plurality of shelves vertically separated from one another and coupled to the first elevator such that the first plurality of shelves and the second plurality of shelves are horizontally separated from one another, wherein each one of the first plurality of totes is on a respective one of the first plurality of shelves and each one of a second plurality of totes is on a respective one of the second plurality of shelves, and wherein each one of the first and second plurality of shelves is configured to be selectively moved horizontally and vertically by the first elevator;

a third plurality of shelves vertically separated from one another and coupled to a second elevator of the plurality of elevators; and a fourth plurality of shelves vertically separated from one another and coupled to the second elevator such that the third plurality of shelves and the fourth plurality of shelves are horizontally separated from one another, wherein each one of a third plurality of totes is on a respective one of the third plurality of shelves and each one of a fourth plurality of totes is on a respective one of the fourth plurality of shelves, and wherein each one of the third and fourth plurality of shelves is configured to be selectively moved horizontally and vertically by the second elevator.

26. An apparatus for order fulfillment, the apparatus comprising:

means for storing items, wherein the means for storing are located along one or more sides of an aisle;

means for moving a picker and totes along the aisle, wherein the means for moving includes means for selectively repositioning at least one of the totes from a first vertical position to a different second vertical position relative to others of the totes;

means for sequentially presenting to the picker identifications of items to be picked from the bins and stowed in the totes; and means for collecting the totes for shipment to customers.

27. The apparatus of claim 26, further comprising:

means for planning when and how all pick and stow operations are to be performed; and means for controlling movement of the totes based at least in part on plans generated by the means for planning.

28. The apparatus of claim 26, wherein the means for moving the picker and totes further includes means for placing the totes in a plurality of horizontal positions.

29. A method comprising:

moving a first plurality of totes to a guided vehicle, and coupling the first plurality of totes to the guided vehicle;

automatically moving the guided vehicle along a first aisle, wherein the first aisle includes a plurality of bins located on a pick wall adjacent to the first aisle;

selectively repositioning at least one of the first plurality of totes from a first vertical position to a different second vertical position relative to others of the first plurality of totes;

picking items from selected ones of the plurality of bins and stowing the picked items in selected ones of the first plurality of totes;

de-coupling the first plurality of totes from the guided vehicle;

moving the first plurality of totes away from the guided vehicle;

moving a second plurality of totes to the guided vehicle, and coupling the second plurality of totes to the guided vehicle;

picking items from selected ones of the plurality of bins and stowing the picked items in selected ones of the second plurality of totes;

de-coupling the second plurality of totes from the guided vehicle; and moving the second plurality of totes away from the guided vehicle.

* * * * *